United States Patent
Kodera et al.

(10) Patent No.: US 10,423,033 B2
(45) Date of Patent: Sep. 24, 2019

(54) METHOD FOR PRODUCING LIQUID CRYSTAL ALIGNMENT FILM AND LIQUID CRYSTAL DISPLAY ELEMENT USING SAME

(71) Applicant: DIC CORPORATION, Tokyo (JP)

(72) Inventors: Fumiaki Kodera, Kita-adachi-gun (JP); Kunihiko Kotani, Kita-adachi-gun (JP); Kazunori Maruyama, Kita-adachi-gun (JP); Yutaka Kadomoto, Kita-adachi-gun (JP); Masanao Takashima, Kita-adachi-gun (JP); Hiroshi Hasebe, Kita-adachi-gun (JP); Yoshitaka Saito, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/027,141

(22) PCT Filed: Sep. 30, 2014

(86) PCT No.: PCT/JP2014/076132
§ 371 (c)(1),
(2) Date: Apr. 4, 2016

(87) PCT Pub. No.: WO2015/050132
PCT Pub. Date: Apr. 9, 2015

(65) Prior Publication Data
US 2016/0231626 A1   Aug. 11, 2016

(30) Foreign Application Priority Data

Oct. 2, 2013 (JP) ................................. 2013-207318

(51) Int. Cl.
*G02F 1/1337* (2006.01)
*G02F 1/1341* (2006.01)

(52) U.S. Cl.
CPC ...... *G02F 1/133788* (2013.01); *G02F 1/1341* (2013.01); *G02F 1/133711* (2013.01); *G02F 2001/133715* (2013.01)

(58) Field of Classification Search
None
See application file for complete search history.

(56) References Cited

U.S. PATENT DOCUMENTS

2016/0018702 A1*  1/2016  Lee .................. G02F 1/133723
349/123

FOREIGN PATENT DOCUMENTS

| JP | 2000-35578 A | 2/2000 |
| JP | 2002-90752 A | 3/2002 |

(Continued)

OTHER PUBLICATIONS

International Search Report dated Jan. 6, 2015, issued in counterpart Application No. PCT/JP2014/076132 (2 pages).

(Continued)

*Primary Examiner* — Shamim Ahmed
*Assistant Examiner* — Bradford M Gates
(74) *Attorney, Agent, or Firm* — Westermann, Hattori, Daniels & Adrian, LLP

(57) ABSTRACT

[Problem] The purpose of the present invention is to provide a method for developing a large anchoring energy by simple processes. [Solution] There is provided a method for manufacturing a liquid crystal alignment film, comprising: a process (I) of mixing a solvent with a photoresponsive polymer to prepare a photoresponsive polymer solution; a process (II) of coating the photoresponsive polymer solution on a substrate, followed by drying at 50 to 100° C. for 1 to 3 minutes and then drying at 120° C. to 180° C. for 5 to 75 minutes to form a coating film; and a process (III) of adjusting a temperature of the coating film while the coating (Continued)

film is irradiated with a light of 200 to 350 nm to 40° C. to 100° C.

6 Claims, 7 Drawing Sheets

(56) References Cited

FOREIGN PATENT DOCUMENTS

| | | |
|---|---|---|
| JP | 2005-105204 A | 4/2005 |
| JP | 2009-58584 A | 3/2009 |
| JP | 2009-282377 A | 12/2009 |
| NO | 2013/018904 A1 | 2/2013 |

OTHER PUBLICATIONS

Hasebe et al., New Photo-Aligning Materials Having Cinnamoyl Moieties, Proceedings of the International Display Workshops (DW'14), 2014,12,02, vol. 21, pp. 44-47.

* cited by examiner

[Fig. 1]
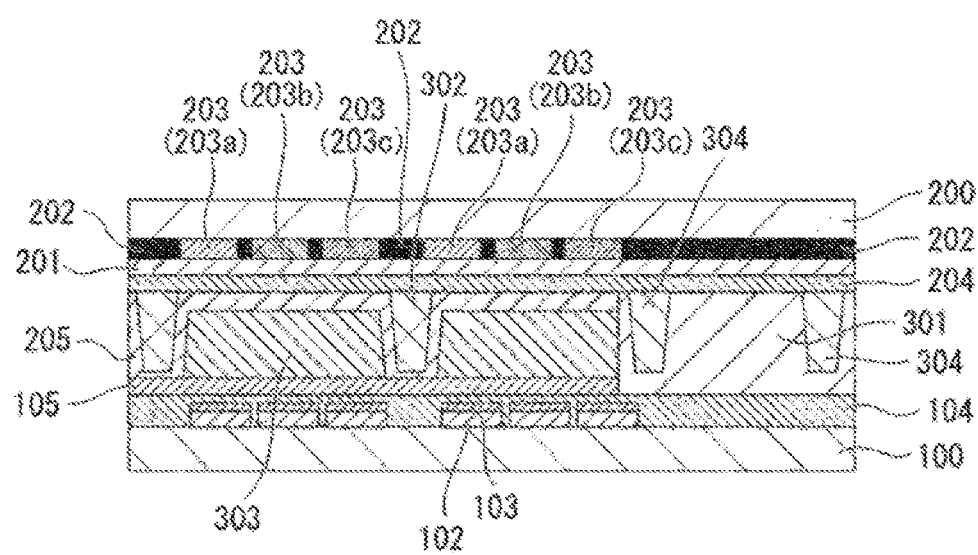
[Fig. 2]
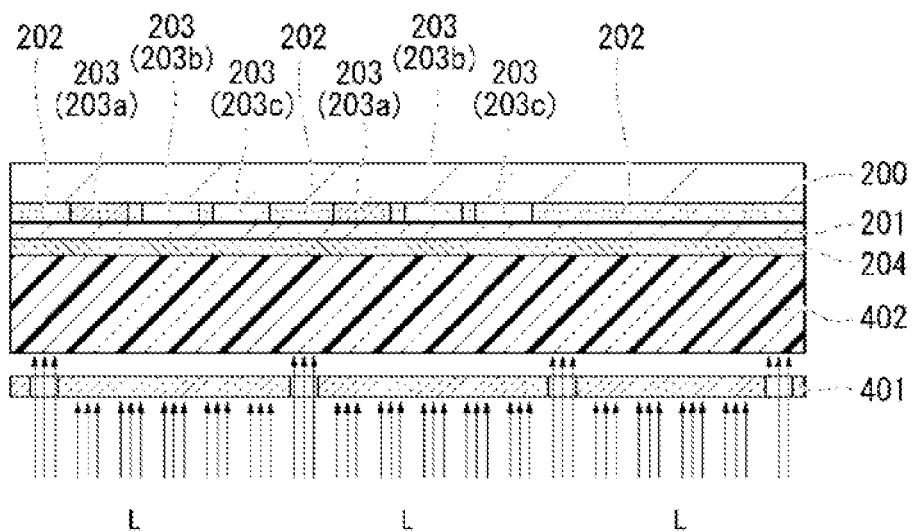

[Fig. 3]
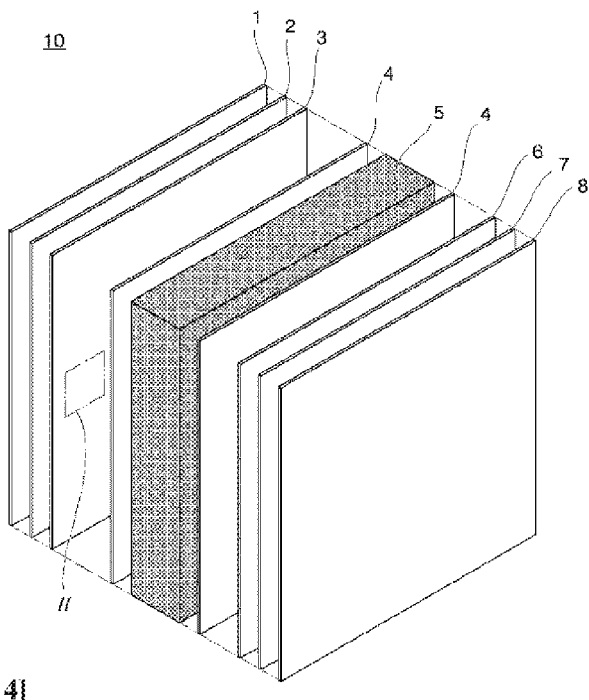
[Fig. 4]
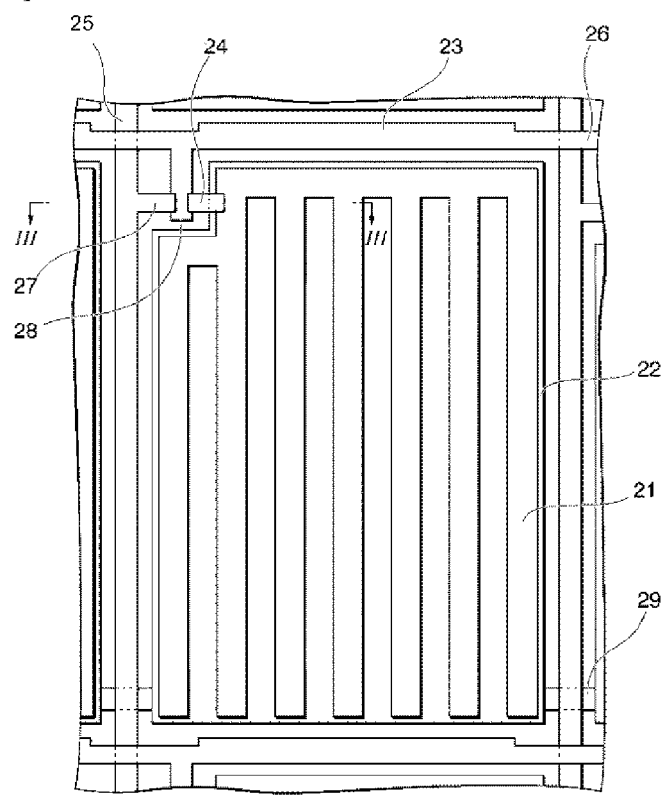

[Fig. 5]
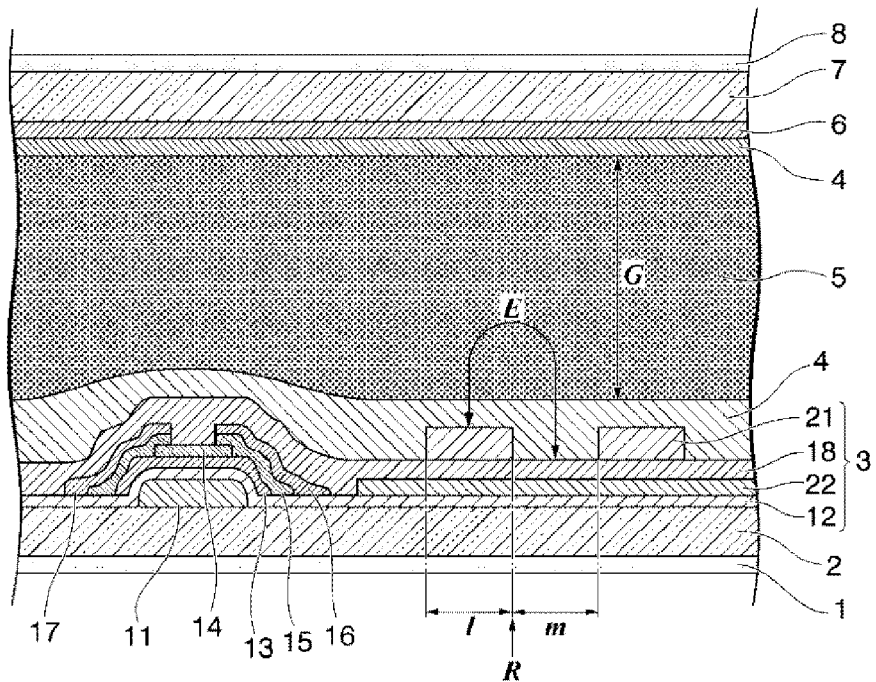
[Fig. 6]
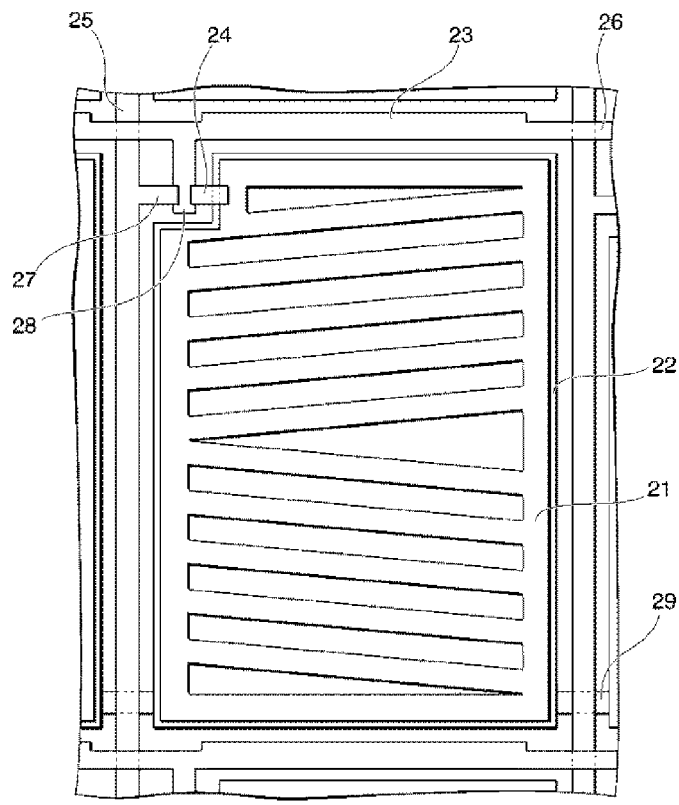

[Fig. 7]
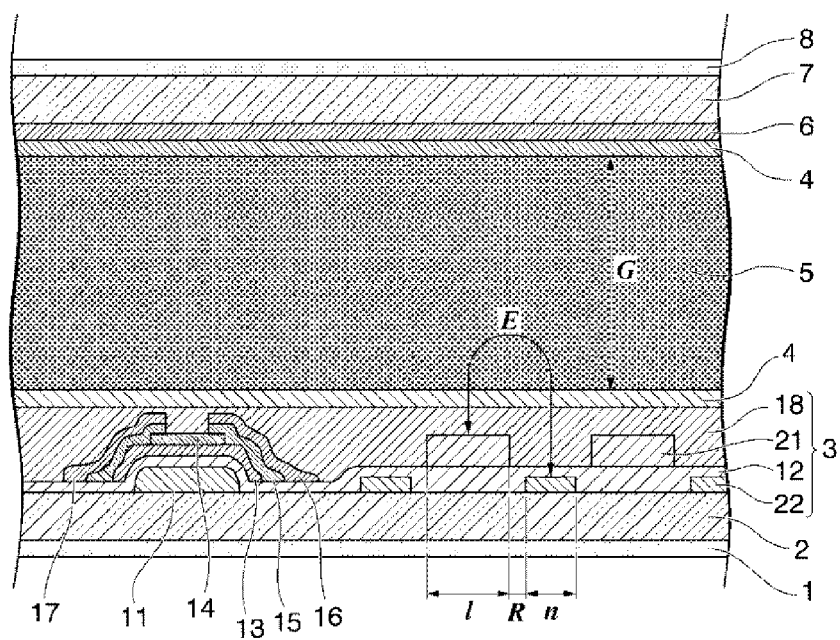

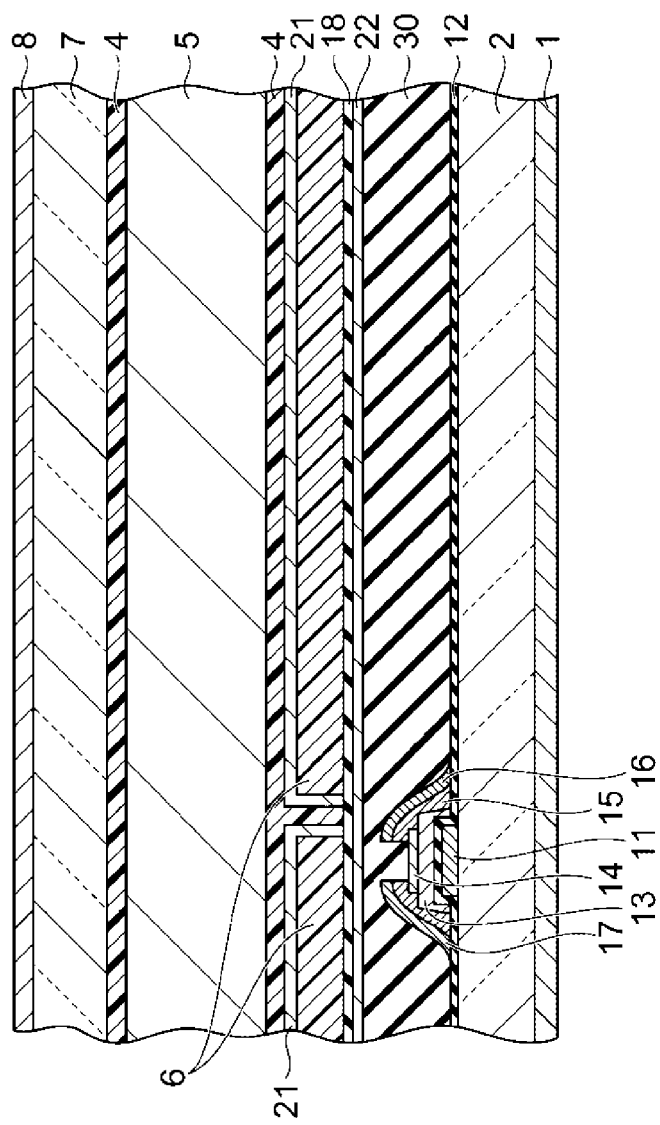

[Fig. 10]
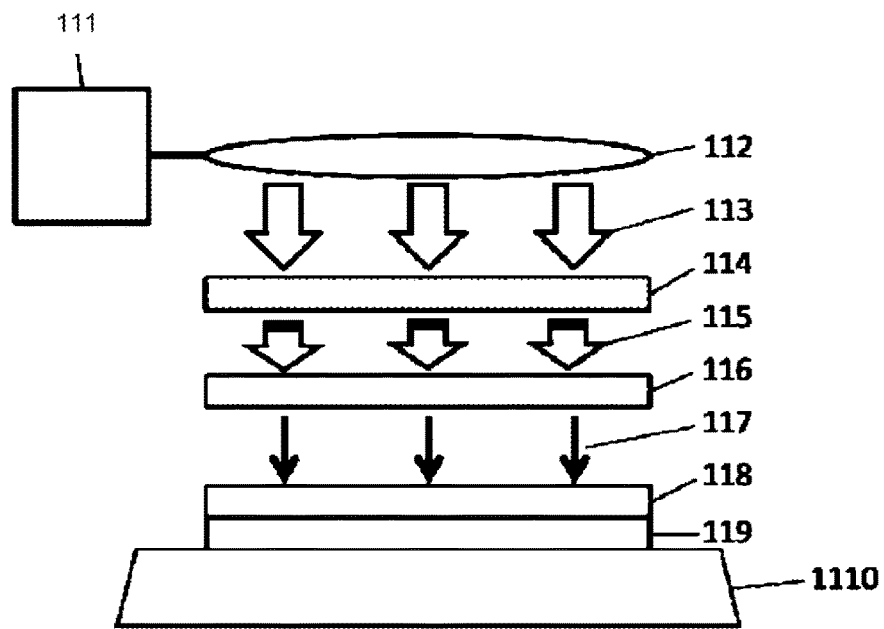
[Fig. 11]
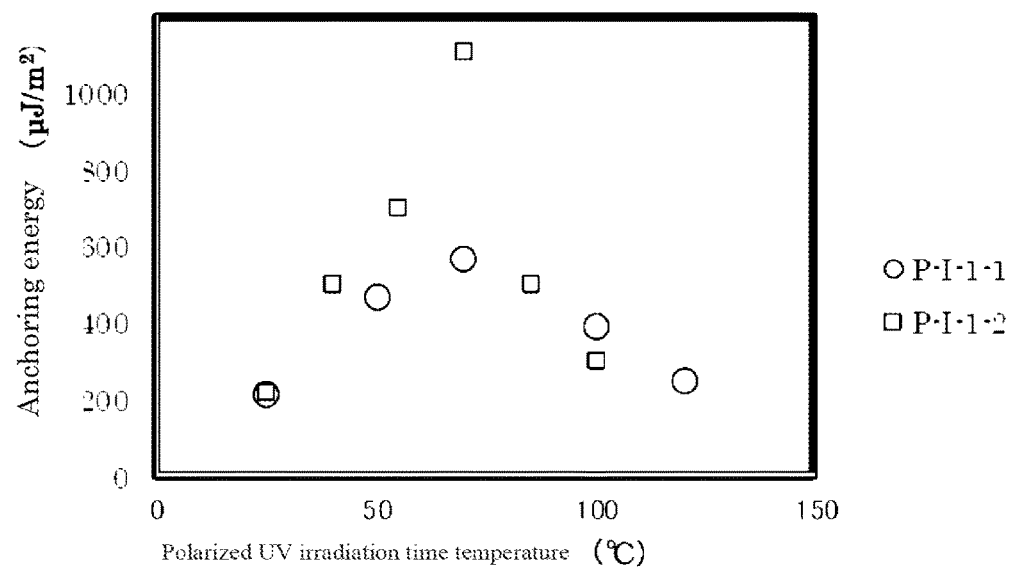

METHOD FOR PRODUCING LIQUID CRYSTAL ALIGNMENT FILM AND LIQUID CRYSTAL DISPLAY ELEMENT USING SAME

TECHNICAL FIELD

The present invention relates to a manufacturing method for producing a liquid crystal alignment film, and a liquid crystal display element using the liquid crystal alignment film provided by the manufacturing method.

BACKGROUND OF THE INVENTION

A liquid crystal display element utilizes the changes of optical properties for displaying, such that the change is made by outside stimulus such as electric fields to change the alignment state of liquid crystal molecules. Such a liquid crystal display element has a structure in which liquid crystal molecules are filled in the gap between two pieces of transparent substrates, and generally, an alignment treatment is applied to the inside of substrates where the liquid crystal molecules contact, in order to align the liquid crystal molecules in a predetermined direction.

The alignment treatment can be roughly classified into two: One is a rubbing method by forming a polymer film such as polyimide on the substrate surface such as glass, which is then rubbed by cloth or the like; and the other is a light alignment method by irradiating light having anisotropy onto the coating film provided on the substrate to provide a liquid crystal alignment ability. The former method, i.e., the rubbing method, is advantageous since the rubbed direction becomes parallel to the longitudinal axis (director) direction of the liquid crystal molecules contacting the substrate, and the production device of the alignment film is simple. However, there have caused problems such as orientation defects occurred due to scratches or dusts on the orientation film surface during the manufacturing process. In addition, as the size of the substrate is upscaled, it has become more difficult to design and maintain a rubbing device to obtain uniform orientation over the entire surface of the substrate and for a long period of time.

On the other hand, the latter method, i.e., the light orientation method is characterized in that a light is irradiated to a compound having a group whose absorbency of the light varies depending on the direction of the electric vector of a polarized light polarization (which is hereinafter referred to as a light orientation group) so as to align the light orientation group into a certain direction, thereby providing a liquid crystal molecule contacting the light orientation group with a liquid crystal orientation ability. Therefore, this method can solve the problems of the rubbing method, such as the orientation defects caused due to the scratches or dusts, or problems in obtaining uniform orientation over the entire surface of the substrate and for a long period of time.

However, in the light orientation method, a significant amount of light exposure dose is required to obtain a practical level of the liquid crystal orientation ability. In particular, when obtaining a large area of a light orientation film, a high power ultraviolet ray lamp is required to be irradiated for a long period of time. As a technique to reduce the light exposure dose, Patent Reference No. 1 discloses a manufacturing method of a liquid crystal alignment film in which a molecule of the compound in the coating film is oriented in a direction corresponding to the polarized light direction by irradiating polarization ultraviolet rays on the coating surface, followed by burning the coating film.

Also, when irradiating with a high power ultraviolet rays lamp for a long time, there causes a problem that the compound having the light orientation group causes photolysis at an irradiated area so as to deteriorate its liquid crystal orientation ability. For example, Patent Reference No. 2 discloses a method in which a part of a photosensitive thin film is irradiated with first radiation exposure, and then, the entire surface of the thin film is irradiated with second radiation exposure that is different from the first radiation exposure in at least one of the polarization state of radiation, the direction of the optical axis, and the energy.

PRIOR ART REFERENCES

Patent References

Patent Reference No. 1: Japanese Laid-Open Patent Publication No. 2002-90752;
Patent Reference No. 2: Japanese Laid-Open Patent Publication No. 2005-105204.

SUMMARY OF THE INVENTION

The Objectives to Solve by the Invention

In fact, as disclosed in Patent Reference No. 1, in case where a coating film that is a compound coated on a substrate is irradiated with polarized ultraviolet rays, followed by burning the coating film, non-cured coating film before the burning has a state where the constituting molecules in the coating film are easy to move. Therefore, it is considered that polarized ultraviolet rays with less energy can orient the elements in the coating film in a specific direction. Also, Patent Reference No. 2 at paragraphs [0105] to [0109] discloses as follow. That is, in the formation of a liquid crystal alignment film, a part of a photosensitive film precursor is responded by a first radiation exposure (150 to 800 nm), and the entire surface of the film is responded by a second radiation exposure (320 to 800 nm), and then, which is heated at 150° C. to 200° C. after the second radiation exposure, if necessary.

However, the method to orient the molecules in a specific direction followed by burning or heat treatment, as disclosed in Patent References Nos. 1 and 2, necessarily involves a multistage process after orienting molecules of compounds. Therefore, in order to obtain a high level of anchoring power, it requires an elongated tact time and costs. Thus, the present invention is intended to solve the complicatedness of this process and to provide a method to develop a large anchoring energy through a simple process.

Means to Solve the Problem

There is provided a method for manufacturing a liquid crystal alignment film, comprising: a process (I) of mixing a solvent with a photoresponsive polymer to prepare a photoresponsive polymer solution; a process (II) of coating the photoresponsive polymer solution on a substrate, followed by drying at 50 to 100° C. for 1 to 3 minutes and then drying at 120° C. to 180° C. for 5 to 75 minutes to form a coating; and
a process (III) of adjusting a temperature of the coating film while irradiating with a light of 200 to 350 nm at 40° C. to 100° C.

Effect of the Invention

According to the manufacturing method of the liquid crystal alignment film of the present invention, there is an effect to improve the alignment regulating force.

According to the manufacturing method of the liquid crystal alignment film of the present invention, there is an effect to improve the anchoring power.

BRIEF DESCRIPTION OF THE DRAWINGS

FIG. 1 is a cross section view of the liquid crystal display element of the present invention. The substrate having the elements 100 to 105 is referred to as "back plane," and the substrate having the with elements 200 to 205 is referred to as "front plane."

FIG. 2 illustrates processes of light exposure treatment using the pattern for producing the columnar spacers formed on the black matrix as a photo mask pattern.

FIG. 3 is an illustrative exploded perspective view of an example of the liquid crystal display element of the present invention.

FIG. 4 is a plan view enlarging the area surrounded by line II on the electrode layer 3 formed on the substrate 2 shown in FIG. 3.

FIG. 5 is a cross section view obtained by cutting the liquid crystal display element shown in FIG. 1 at line III-III shown in FIG. 4.

FIG. 6 is a plan view of another example enlarging the area surrounded by line II on the electrode layer 3 formed on the substrate 2 shown in FIG. 3.

FIG. 7 is a cross section view of another embodiment of the liquid crystal display element shown in FIG. 1 at line III-III shown in FIG. 4.

FIG. 8 is a cross section view of the liquid crystal display element as a color-on-filter.

FIG. 10 is a conception diagram showing the manufacturing method of the alignment film of the present invention.

FIG. 11 is a view showing a relationship between the temperature of the polarized light irradiation time and the anchoring energy.

EMBODIMENTS TO CARRY OUT THE INVENTION

Figure 9:
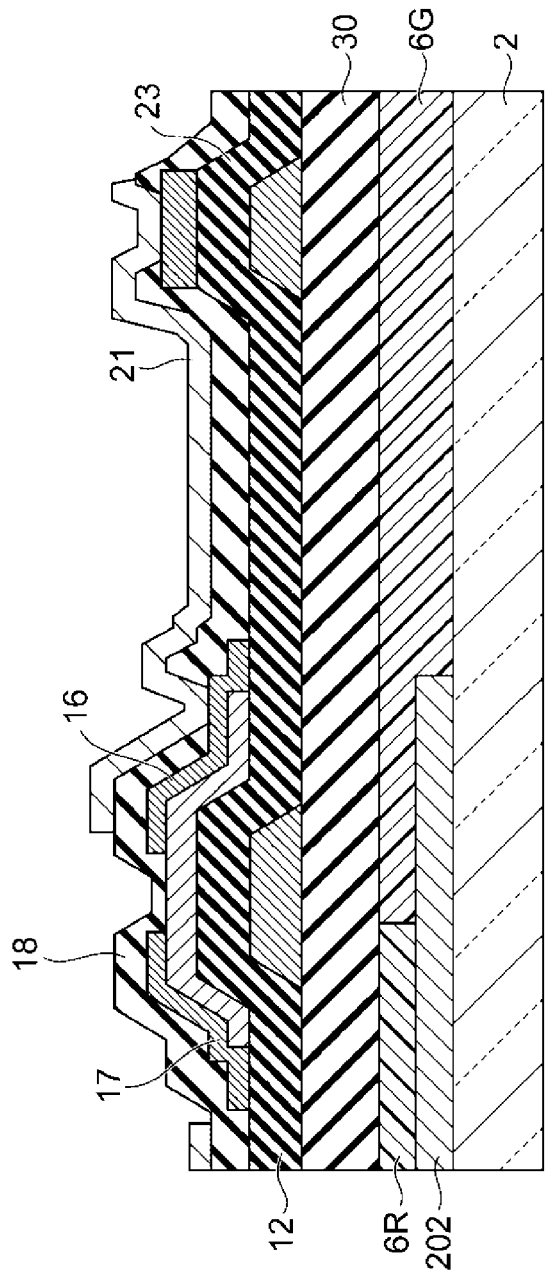
FIG. 9 is a cross section view of another example of the liquid crystal display element as a color-on-filter.

The first aspect of the present invention is a method for manufacturing a liquid crystal alignment film, comprising: a process (I) of mixing a solvent with a photoresponsive polymer to prepare a photoresponsive polymer solution; a process (II) of coating the photoresponsive polymer solution on a substrate, followed by drying at 50 to 100° C. for 1 to 3 minutes and then drying at 120° C. to 180° C. for 5 to 75 minutes to form a coating; and a process (III) of adjusting a temperature of the coating film while the coating film is irradiated with a light of 200 to 350 nm at 40° C. to 100° C.

According to the manufacturing method of the present invention, it is considered that since the change of the molecular structure in response to light is promoted, the effect of improvement of the anchoring power can be exhibited. Hereinafter, each process is explained.

"Process (I)"

The process (I) is to mix a solvent with a photoresponsive polymer to prepare a photoresponsive polymer solution.

As a result, it is considered that a photoresponsive polymer film having a homogeneous film thickness can be formed.

The solvent used in the present invention is not particularly limited, so long as it can dissolve a photoresponsive polymer. It can be appropriately selected depending on the property of the photoresponsive polymer to be used. As a solvent dissolving a photoresponsive polymer, the examples can include a lactone type such as γ-butyrolactone; a ketone type such as cyclopentanone, cyclohexanone, MEK and MIBK; an ester type such as propylene glycol monomethyl ether acetate, and NMP (N-methyl-2-pyrrolidone). In addition, as a solvent for the purpose of raising the application characteristics to the substrate, a solvent such an alcohol ether type such as 2-methoxyethanol, 2-butoxy ethanol (butylcellosolve), and a toluene type such as toluene can be added to the solvent, if necessary.

The photoresponsive polymer of the present invention is preferably selected from the group consisting of a photoresponsive decomposition type polymer, a photoresponsive dimerization type polymer, and a photoresponsive isomerization type polymer.

In the present invention, as the photoresponsive dimerization type polymer that can form a crosslinked structure by dimerization between side chains in response to light, it is preferable to possess a high light sensitivity and a large orientation characteristic. Specifically, the photoresponsive dimerization type polymer of the present invention can be preferably a compound represented by general formula (I) and/or (II).

[Formula 1]

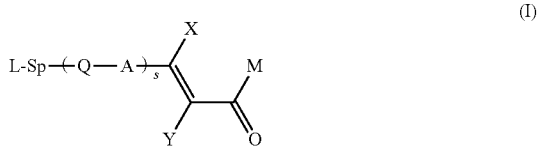

[Formula 2]

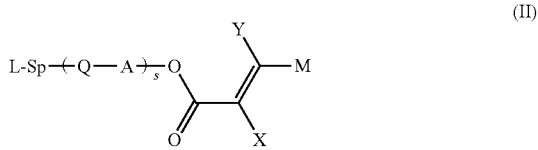

(in the general formula (I) or (II) above, L represents a group derived from a polymerizable group; Sp is a spacer group, that is, a divalent connection group selected from the group consisting of single bond, —(CH$_2$)$_u$— (In the formula, u represents 1 to 20), —OCH$_2$—, —CH$_2$O—, —COO—, —OCO—, —CH═CH—, —CF═CF—, —CF$_2$O—, —OCF$_2$—, —CF$_2$CF$_2$— and —C≡C—, wherein in these substituents, one or more of noncontiguous CH$_2$ groups therein can be independently replaced with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C— or —O—CO—O— (In the formula, R independently represents hydrogen or an alkyl group with a carbon atom number of 1 to 5.); Q represents a direct bond, —O—, —CO—O— or —O—CO—;

A represents a structure selected from the group consisting of trans-1,4-cyclohexylene group (in the group, one methylene group, or two or more methylene groups not adjacent to each other, can be substituted with —O—, —NH— or —S—), 1,4-phenylene group (in the group, one or more groups of —CH═ can be substituted with —N═), 1,4-cyclohexenylene group, 2,5-thiophenylene group, 2,5-furanyl group, 1,4-bicyclo(2.2.2)octylene group, naphthalene-1,4-diyl group, naphthalene-2,6-diyl group, decahydronaphthalene-2,6-diyl group and 1,2,3,4- tetrahydronaphthalene-2,6-diyl group, wherein the functional group can be unsubstituted, or at least one of the hydrogen atoms thereof can be substituted with fluorine atom, chlorine atom, cyano group, methyl group, or methoxy group;

s represents an integer of 0 to 4, wherein when s represents 2 to 4, A and/or Q exist in plural, which can be the same as or different from each other;

X and Y independently represents hydrogen atom, fluorine atom, chlorine atom, cyano group or an alkyl group having a carbon atom number of 1 to 20, wherein the hydrogen atom existing in the alkyl group can be substituted with fluorine atom, wherein when there is in the alkyl group one methylene group, or two or more methylene groups not adjacent to each other, said one methylene group, or said two or more methylene groups not adjacent to each other can be replaced with —O—, —CO—O—, —O—CO— or —CH=CH—;

M represents general formula (IIa) below, general formula (IIb) below, or general formula (IIc) below.

[Formula 3]

----O—R$^{11}$    (IIa)

$R^{11}$
----N—R$^{12}$    (IIb)

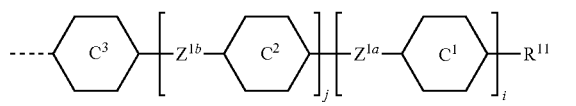    (IIc)

(In the formula, the dashed line represents a bond with a carbon atom, each of R$^{11}$ and R$^{12}$ represents hydrogen atom or an alkyl group with a carbon atom number of 1-30, independently, when there is one methyl group, or are two or more methyl groups not adjacent to each other, in the R$^{11}$ and R$^{12}$, said one methyl group, or said two or more methyl groups not adjacent to each other can be substituted with —O—, —CO—, —CO—O—, —O—CO—, —CO—NH—, —NH—CO—, —NCH$_3$—, —CH=CH—, —CF=CF— or —C≡C—, the hydrogen atom in R$^{11}$ and R$^{12}$ can be substituted with alkyl group with a carbon atom number of 1-20, cyano group or halogen atom;

each of ring C$^1$, ring C$^2$ and ring C$^3$ independently represents:

(a) trans-1,4-cyclohexylene group (in the group, one methyl group or two or more methyl groups not adjacent to each other can be substituted with —O—, —NH— or —S—), (b) 1,4-phenylene group (in the group, one or two or more groups of —CH= can be substituted with —N=), and (C) a group selected from the group consisting of the 1,4-cyclohexenylene group, 2,5-thiophenylene group, 2,5-furanyl group, 1,4-bicyclo(2.2.2)octylene group, naphthalene-1,4-diyl group, naphthalene-2,6-diyl group, decahydronaphthalene-2,6-diyl group and 1,2,3,4-tetrahydronaphthalene-2,6-diyl group, the group (a), the group (b) and the group (c) as mentioned above can be unsubstituted, or one or more hydrogen atom can be substituted with fluorine atom, chlorine atom, cyano group, methyl radical, methoxy group or ethoxy groups, each of Z$^{1a}$ and Z$^{1b}$ independently represents a single bond, —(CH$_2$)$_v$—, —O—, —CO—, —CO—O—, —O—OC—, —NR$_7$—, —CO—NR$_7$—, —NR$_7$—CO—, —(CH$_2$)$_u$—O—, —O—(CH$_2$)$_u$—, —(CH$_2$)$_u$—NR$_7$ or —NR$_7$(CH$_2$)$_u$—, and in this case, R$^7$ represents hydrogen atom or a lower alkyl group, v represents an integer of 1-4, u represents an integer of 1-3, and each of i and j represents 0 or 1.).

The group Sp is more preferably an alkylene oxide group having a carbon atom number of 6 to 12, or —(CH$_2$)$_m$— (where m represents an integer of 8 to 12).

Also, it is preferable that said group derived from the polymerizable group is selected from the group consisting of groups derived from polymerizable groups represented by the following general formulae (III-1) to (III-11).

[Formula 4]

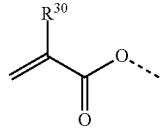    (III-1)

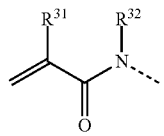    (III-2)

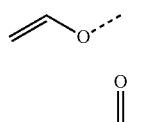    (III-3)

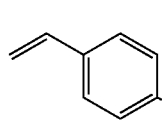    (III-4)

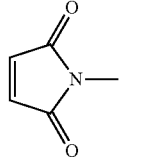    (III-5)

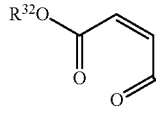    (III-6)

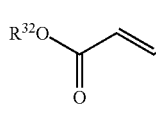    (III-7)

    (III-8)

    (III-9)

    (III-10)

-continued

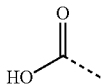

(III-11)

(In the formula, the dashed line express a bond connecting to Sp;

$R^{30}$ represents hydrogen atom, fluorine atom, chlorine atom, an alkyl group having a carbon atom number of 1 to 4, phenyl group or phenoxy group;

$R^{31}$ represents hydrogen atom, chlorine atom, methyl group or phenyl group;

$R^{32}$ each independently represents hydrogen atom or an alkyl group with a carbon atom number of 1 to 5.).

Furthermore, the photoresponsive dimerization type polymer can be substituted with the general formula (1) below:

[Formula 5]

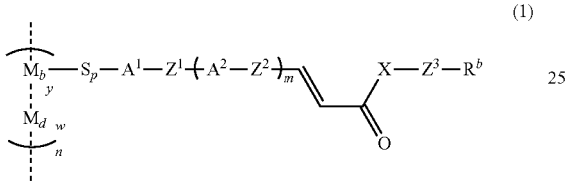

(1)

(In the general formula (1) above, Sp is a spacer group, that is, a divalent connection group selected from the group consisting of single bond, —(CH$_2$)$_u$— (In the formula, u represents 1 to 20), —OCH$_2$—, —CH$_2$O—, —COO—, —OCO—, —CH═CH—, —CF═CF—, —CF$_2$O—, —OCF$_2$—, —CF$_2$CF$_2$— and —C≡C—, wherein in these substituents, one or more of noncontiguous CH$_2$ groups therein can be independently replaced with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C— or —O—CO—O— (In the formula, R independently represents hydrogen or an alkyl group with a carbon atom number of 1 to 5.); A1 and A2 each independently represents
(a): trans-1,4-cyclohexylene group (in the group, one methylene group or two or more methylene groups not adjacent to each other can be substituted with —O—, —NH— or —S—),
(b) 1,4-phenylene group (in the group, one or two or more groups of —CH═ can be substituted with —N═), and
(C) a group selected from the group consisting of 1,4-cyclohexenylene group, 2,5-thiophenylene group, 2,5-furanyl group, 1,4-bicyclo(2.2.2)octylene group, naphthalene-1,4-diyl group, naphthalene-2,6-diyl group, decahydronaphthalene-2,6-diyl group and 1,2,3,4-tetrahydronaphthalene-2,6-diyl group, wherein the group (a), the group (b) and the group (c) above each can be unsubstituted, or one or more of hydrogen atoms therein can be substituted with fluorine atom, chlorine atom, cyano group, methyl group or methoxy group;

$Z^1$, $Z^2$ and $Z^3$ are each independently a single bond, —(CH2)u- (In the formula, u represents 1 to 20.) —OCH$_2$—, —CH$_2$O—, —COO—, —OCO—, —CH═CH—, —CF═CF—, —CF$_2$O—, —OCF$_2$—, —CF$_2$CF$_2$— or —C≡C—, wherein in these substituents, one or more of noncontiguous CH$_2$ groups therein can be independently replaced with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C— or —O—CO—O— (In the formula, R independently represents hydrogen or an alkyl group with a carbon atom number of 1 to 5.);

X represents —O—, —NR— or phenylene group;

Rb represents a polymerizable group, an alkoxy group, cyano group, or a fluorinated alkyl group having a carbon number of 1 to 12;

m represents 0, 1 or 2;

Mb and Md are each independently the same as or different from each other, and represented by a monomer unit of either one kind of the following general formulae (U-1) to (U-13).

[Formula 6]

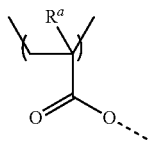

(U-1)

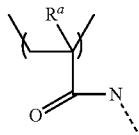

(U-2)

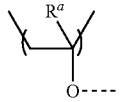

(U-3)

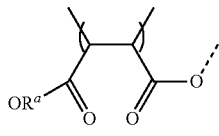

(U-4)

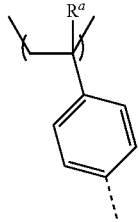

(U-5)

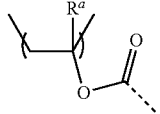

(U-6)

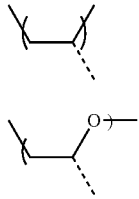

(U-7)

(U-8)

-continued

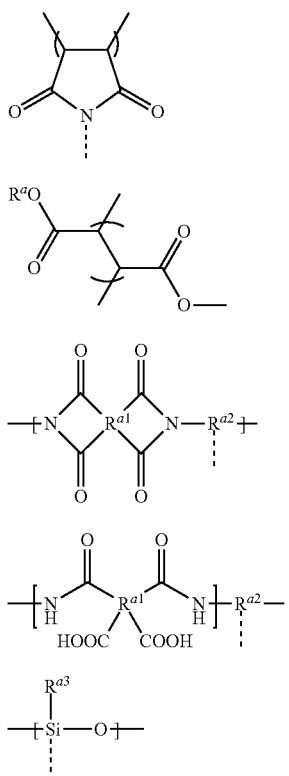

(U-9)

(U-10)

(U-11)

(U-12)

(U-13)

(In the general formulae (U-1) to (U-10) as mentioned above, the dashed line represents a bond connecting to Sp or a monovalent organic group;

$R^a$ independently represents hydrogen atom, an alkyl group having a carbon atom number of 1 to 5, phenyl group, and halogen atom, wherein any hydrogen atom in each structure can be substituted with fluorine atom, chlorine atom, methyl group, phenyl group, methoxy group;

in the general formulae (U-11) to (U-13) above, the dashed line represents a bond connecting to Sp, $R^1$ represents a tetravalent ring structure; $R^2$ represents a trivalent organic group; and $R^3$ represents hydrogen atom, hydroxyl group, an alkyl group having a carbon atom number of 1 to 15, and an alkoxy group having a carbon atom number of 1 to 15.);

y and w represent a molar fraction of a copolymer, and are $0<y\le1$ and $0\le w<1$;

n represents 4 to 100,000;

the monomer unit of Mb and Md each can be composed of one kind or two different kinds of units). It is preferably a polymer, a hydrolysate thereof, or a condensate of the hydrolysate thereof.

The monovalent organic group can be represented by general formula (VII):

[Formula 7]

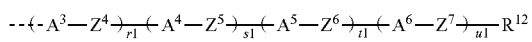

(VII)

(In the formula, the dashed line represents a bond connecting to Md; $Z^4$, $Z^5$, $Z^6$ and $Z^7$ are each independently a single bond, $-(CH_2)_u-$ (In the formula, u represents 1 to 20.), $-OCH_2-$, $-CH_2O-$, $-COO-$, $-OCO-$, $-CH=CH-$, $-CF=CF-$, $-CF_2O-$, $-OCF_2-$, $-CF_2CF_2-$ or $-C\equiv C-$, wherein in these substituents, one or more of noncontiguous $CH_2$ groups therein can be independently replaced with $-O-$, $-CO-$, $-CO-O-$, $-O-CO-$, $-Si(CH_3)_2-O-Si(CH_3)_2-$, $-NR-$, $-NR-CO-$, $-CO-NR-$, $-NR-CO-O-$, $-O-CO-NR-$, $-NR-CO-NR-$, $-CH=CH-$, $-C\equiv C-$ or $-O-CO-O-$ (In the formula, R independently represents hydrogen or an alkyl group with a carbon atom number of 1 to 5.); $A^3$, $A^4$, $A^5$, and $A^6$ each independently represents (a): trans-1,4-cyclohexylene group (in the group, one methylene group or two or more methylene groups not adjacent to each other can be substituted with $-O-$, $-NH-$ or $-S-$), (b) 1,4-phenylene group (in the group, one or two or more groups of $-CH=$ can be substituted with $-N$), and (C) a group selected from the group consisting of 1,4-cyclohexenylene group, 2,5-thiophenylene group, 2,5-furanyl group, 1,4-bicyclo(2.2.4)octylene group, naphthalene-1,4-diyl group, naphthalene-2,6-diyl group, decahydronaphthalene-2,6-diyl group and 1,2,3,4-tetrahydronaphthalene-2,6-diyl group, wherein the group (a), the group (b) and the group (c) above each can be unsubstituted, or one or more of hydrogen atoms therein can be substituted with fluorine atom, chlorine atom, cyano group, methyl group or methoxy group;

r1, s1, t1 and u1 each independently represents 0 or 1;

$R^{12}$ represents hydrogen, fluorine, chlorine, cyano group or an alkyl group having a carbon number of 1 to 20, wherein the hydrogen atom in the alkyl group can be substituted with fluorine atom, wherein one $CH_2$ group or non-adjacent two or more $CH_2$ groups can be substituted with $-O-$, $-CO-O-$, $-O-CO-$ and/or $-CH=CH-$.). Also, a preferable embodiment of the photoresponsive dimerization type polymer represented by the general formula (1) of the present invention above is preferably a polymer in which $Z^2$ is a single bond.

Furthermore, the photoresponsive dimerization type polymer represented by general formula (1) of the present invention can be preferably represented by general formula (2) below:

[Formula 8]

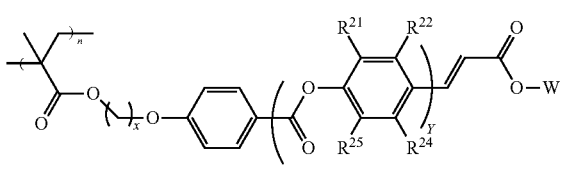

(2)

(In general formula (2) as mentioned above, $R^{21}$ to $R^{24}$ are each independently hydrogen atom, or an alkoxy group having a carbon atom number of 1 to 5;

W represents hydrogen atom, fluorine atom, methyl group, methoxy group, ethyl group or ethoxy group, W represents at least one kind selected from the group consisting of general formulae (W-1) to (W-8).

[Formula 9]

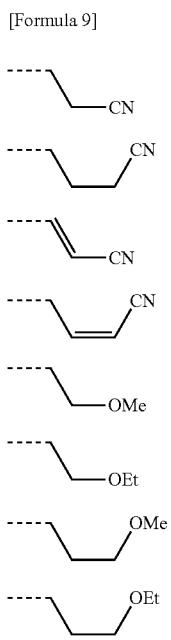

(W-1)
(W-2)
(W-3)
(W-4)
(W-5)
(W-6)
(W-7)
(W-8)

X represents an integer of 6 to 12; Y represents an integer of 0 to 2.).

In general formula (2) above, in view of securing good orientation with small dose of polarized UV light irradiation, it is particularly preferable that W is a group represented by (W-1).

In addition, it is preferable that each of the alkyl group and the alkoxy group of the present invention is linear, cyclic or branched, and in particular, it is further preferable that it is linear or branched. Furthermore, the examples of the "alkyl group" of the present invention can include methyl group, ethyl group, propyl group, butyl group, isopropyl group, isobutyl group, t-butyl group, 3-pentyl group, isopentyl group, neopentyl group, pentyl group, hexyl group, heptyl group, and octyl group. In addition, in the specification of the present application, the examples of the alkyl group are common, and can be appropriately selected from the examples as mentioned above in accordance with the carbon atom number of each alkyl group.

It is preferable that the example of the "alkoxy group" of the present invention is a group in which oxygen atom is directly connected to an alkyl group. The examples can preferably include methoxy group, ethoxy group, propoxy group (n-propoxy group, i-propoxy group), butoxy group, pentyloxy group, and octyloxy group. In addition, in the specification of the present application, the examples of the alkoxy group are common, and can be appropriately selected from the examples as mentioned above in accordance with the carbon atom number of each alkoxy group.

A favorable embodiment of the manufacturing method of liquid crystal alignment film of the present invention is as follows. That is, it is a method for manufacturing a liquid crystal alignment film, comprising:
a process (I) of mixing a solvent with a photoresponsive dimerization polymer to prepare a photoresponsive dimerization polymer solution, the photoresponsive dimerization polymer forming a crosslinked structure through dimerization of side chains in response to light; a process (II) of coating the photoresponsive dimerization polymer solution on a substrate, followed by drying at 50 to 100° C. for 1 to 3 minutes and then drying at 120° C. to 180° C. for 5 to 75 minutes to form a coating film; and a process (III) of adjusting a temperature of the coating film while the coating film is irradiated with a light of 200 to 350 nm at 40° C. to 100° C.

According to the manufacturing method of the present invention, it is considered that since the dimerization of the polymer is particularly promoted, the effect of improvement of the anchoring power can be obtained. Therefore, as the photoresponsive polymer of the present invention, a photoresponsive dimerization type polymer is particularly preferable.

As to the photoresponsive dimerization type polymer, the light to be used for the dimerization between side chains is preferably of 200 to 350 nm; in particular, it is more preferably of 250 to 350 nm; it is further preferable to be 250 to 330 nm.

It is preferable that the photoresponsive decomposition type polymer of the present invention is prepared by condensation between tetracarboxylic dianhydride and a diamine compound.

The tetracarboxylic dianhydride above can include the formulae (A-1) to (A-43) below.

[Formula 10]

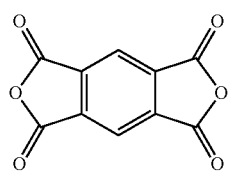

(A-1)

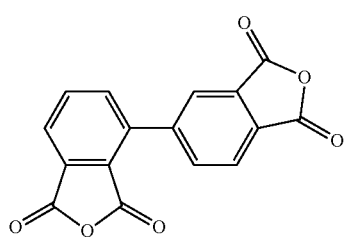

(A-2)

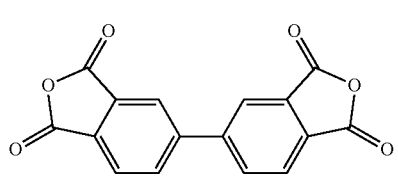

(A-3)

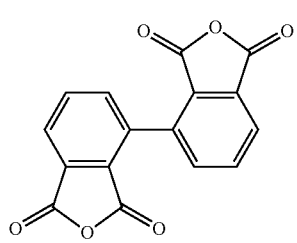

(A-4)

[Formula 11]
(A-5)
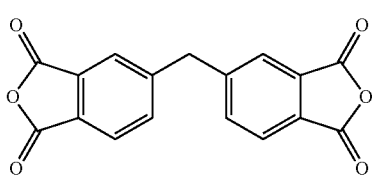
(A-6)
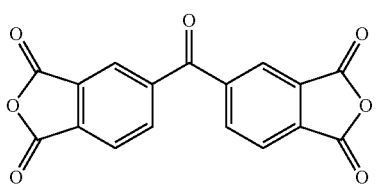
(A-7)
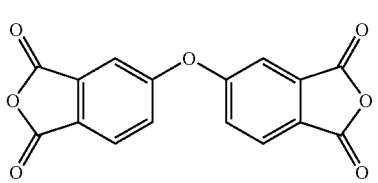
(A-8)
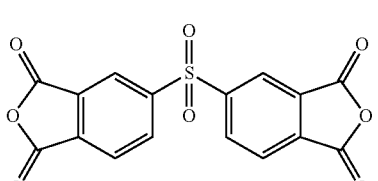
(A-9)
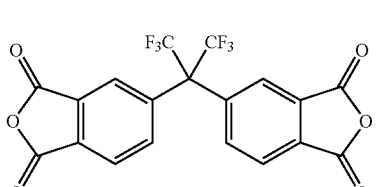
[Formula 12]
(A-10)
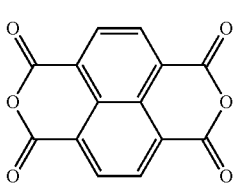
(A-11)
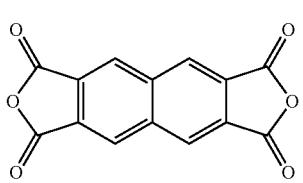
(A-12)
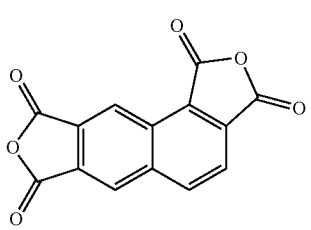
(A-13)
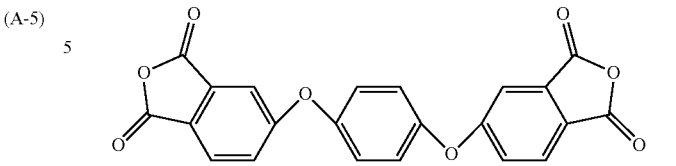
(A-14)
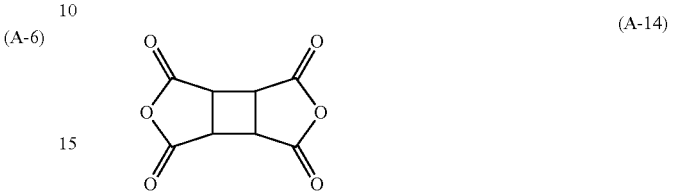
(A-15)
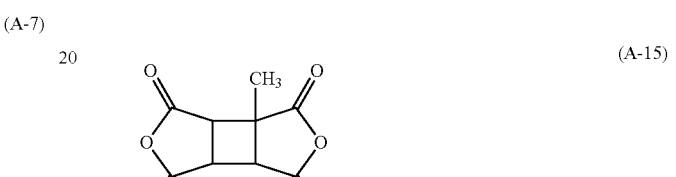
(A-16)
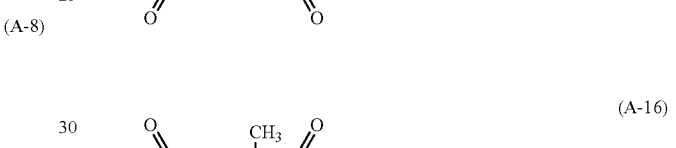
(A-17)
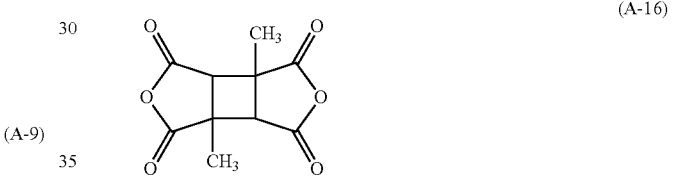
[Formula 13]
(A-18)
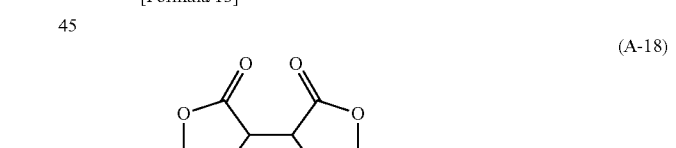
(A-19)
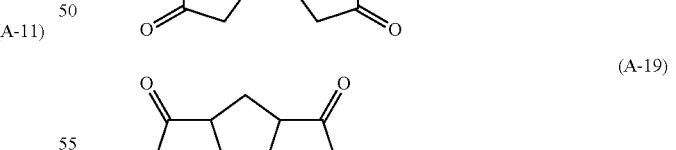
(A-20)
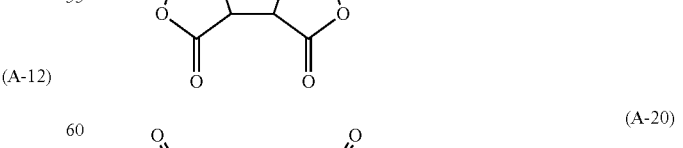

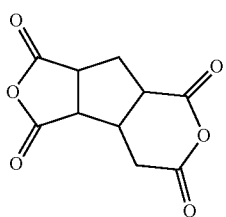
(A-21)
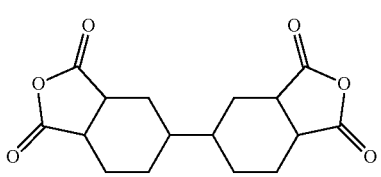
(A-22)
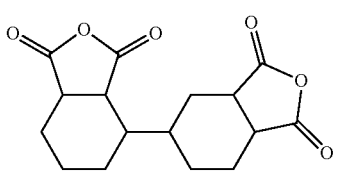
(A-23)
[Formula 14]
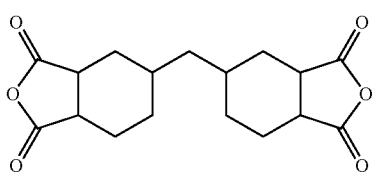
(A-24)
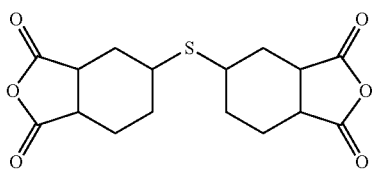
(A-25)
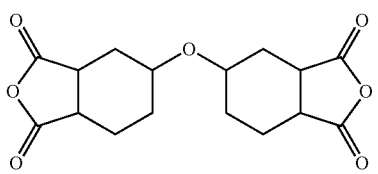
(A-26)
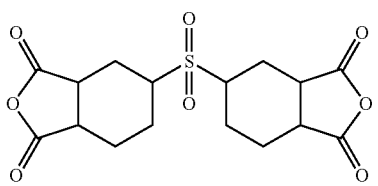
(A-27)
[Formula 15]
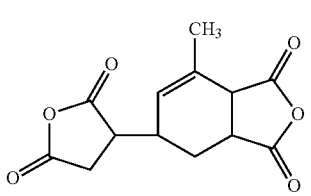
(A-28)
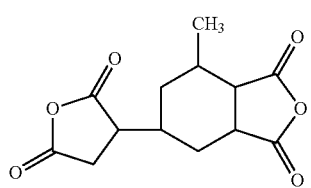
(A-29)
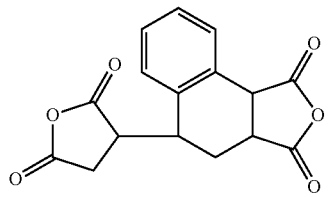
(A-30)
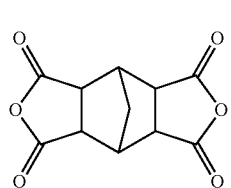
(A-31)
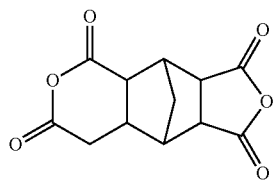
(A-32)
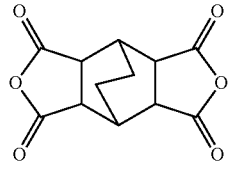
(A-33)
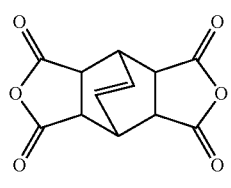
(A-34)
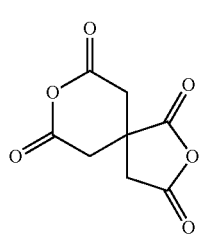
(A-35)
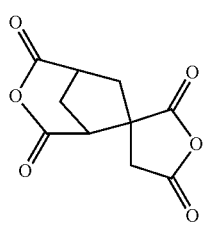
(A-36)

-continued
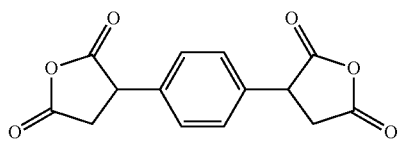
(A-37)
[Formula 16]
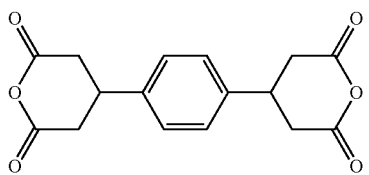
(A-38)
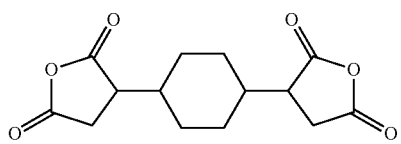
(A-39)
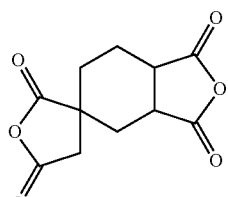
(A-40)
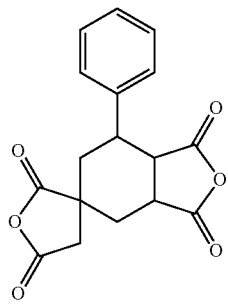
(A-41)
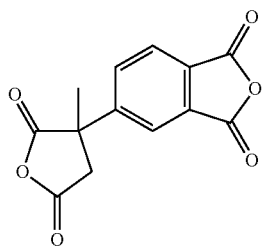
(A-42)
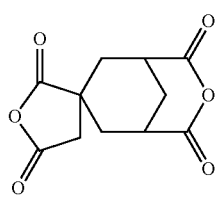
(A-43)
Among these compounds, it is preferable to use the formula (A-14), formula (A-15), formula (A-16), formula (A-17), formula (A-20), formula (A-21), formula (A-28), formula (A-29), formula (A-30) or formula (A-31). It is particularly preferable to use formula (A-14) or formula (A-21).
The diamine compound can include the formulae (III-1) to (VIII-17).
[Formula 17]
(III-1)
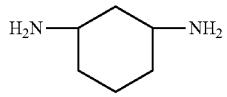
(III-2)
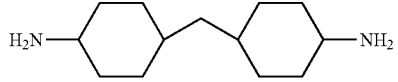
(IV-1)
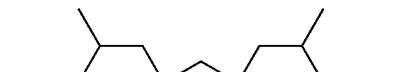
(IV-2)
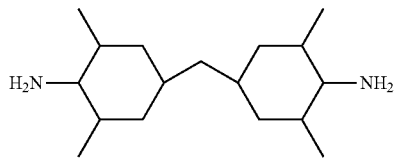
(IV-3)
(V-1)
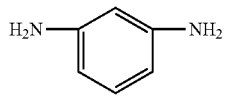
(V-2)
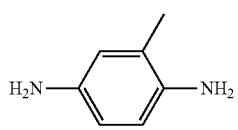
(V-3)
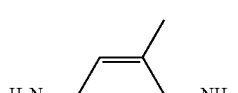
(V-4)
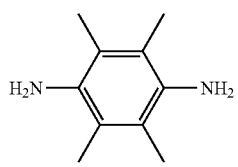
(V-5)

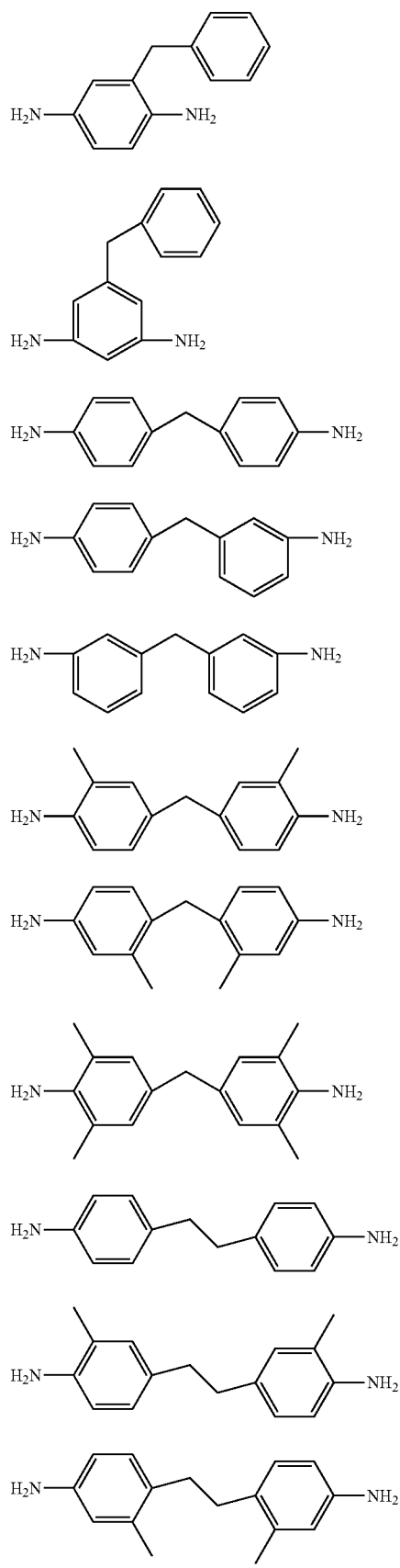
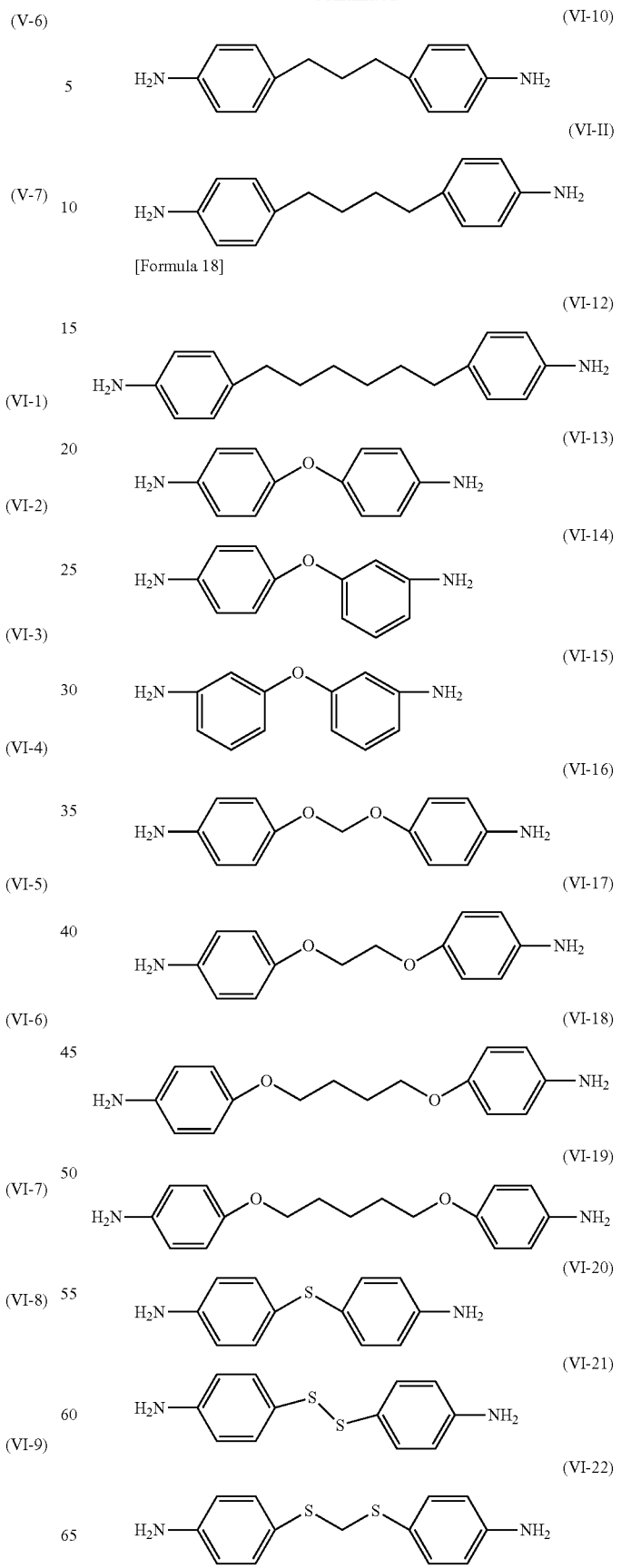

(VI-23)
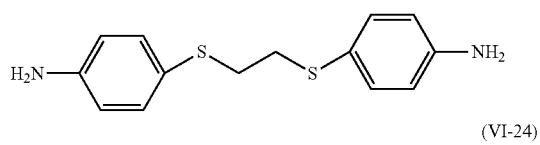
(VI-24)
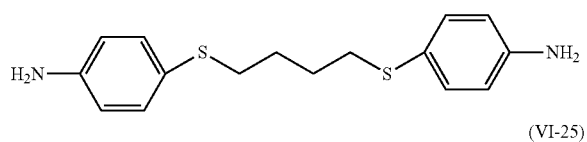
(VI-25)
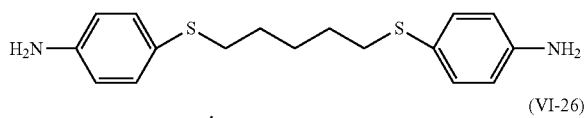
(VI-26)
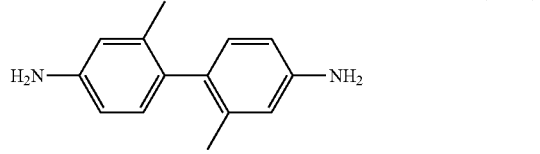
(VI-27)
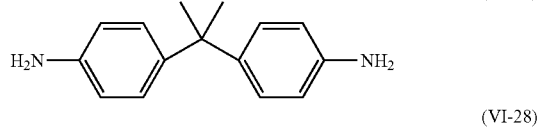
(VI-28)
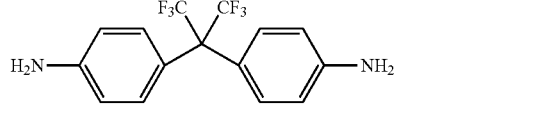
(VI-29)
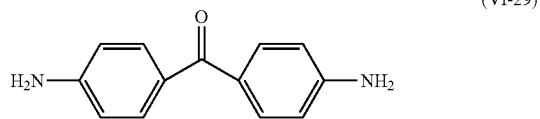
(VI-30)
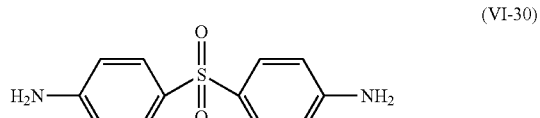
[Formula 19]
(VII-1)
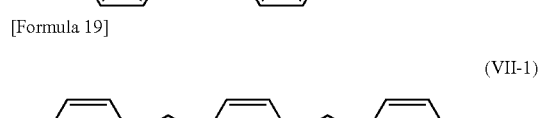
(VII-2)
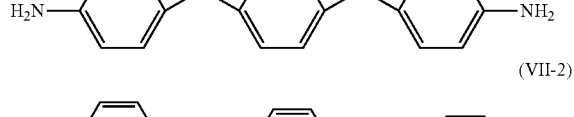
(VII-3)
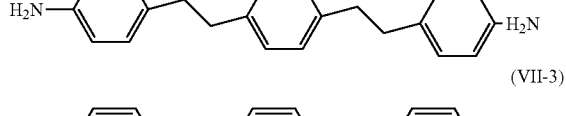
(VII-4)
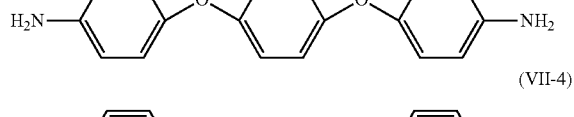
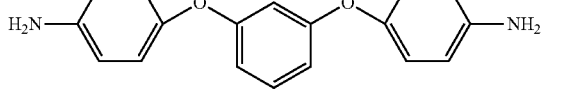
(VII-5)
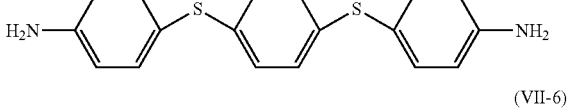
(VII-6)
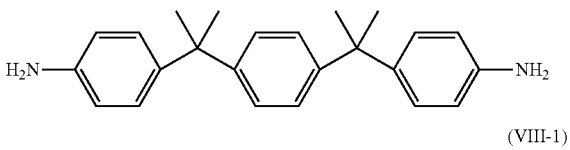
(VIII-1)
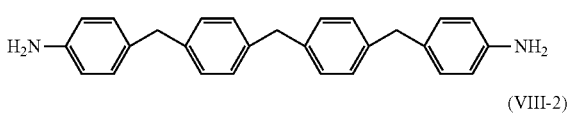
(VIII-2)
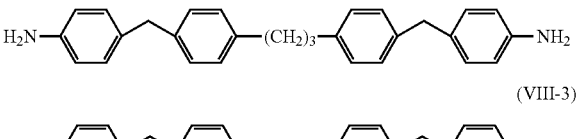
(VIII-3)
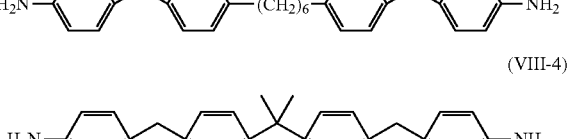
(VIII-4)
(VIII-5)
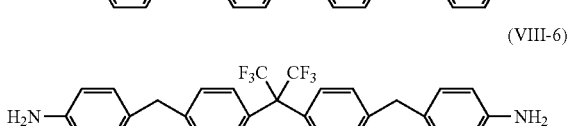
(VIII-6)
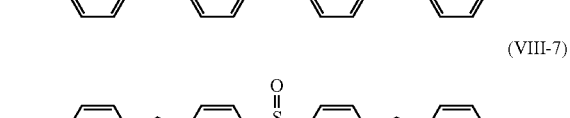
(VIII-7)
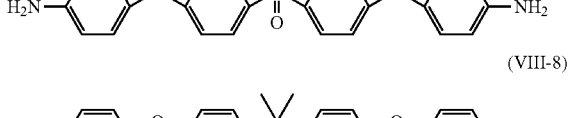
(VIII-8)
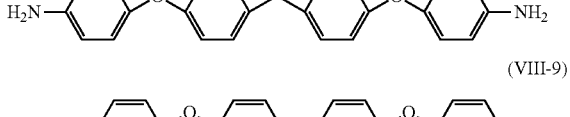
(VIII-9)
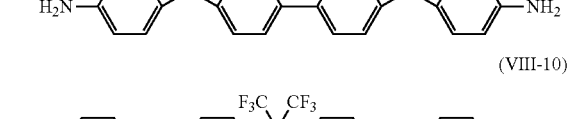
(VIII-10)
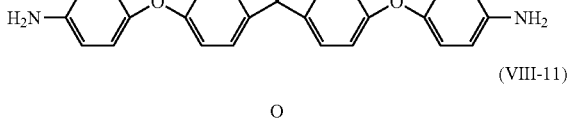
(VIII-11)
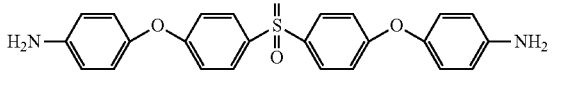

[Formula 20]
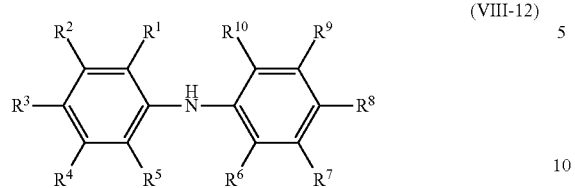
(In the formula (VIII-12), two of R1 to R10 are primary amino group, and the remainders are hydrogen atom or monovalent organic group other than primary amino group, and they are the same as or different from each other.)
[Formula 21]
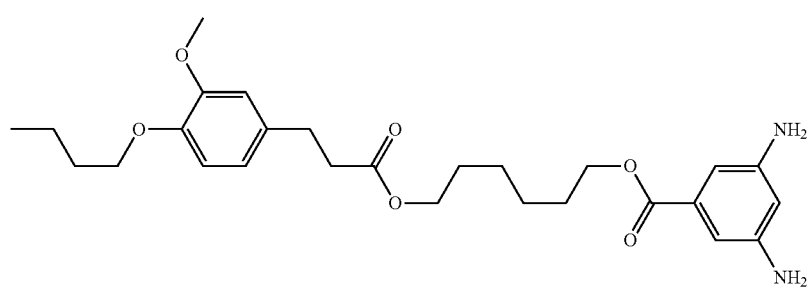
(VIII-13)
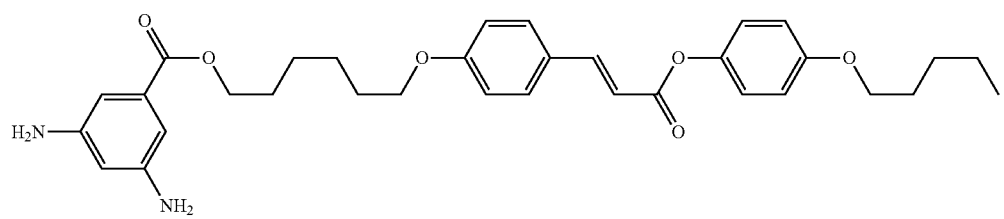
(VIII-14)
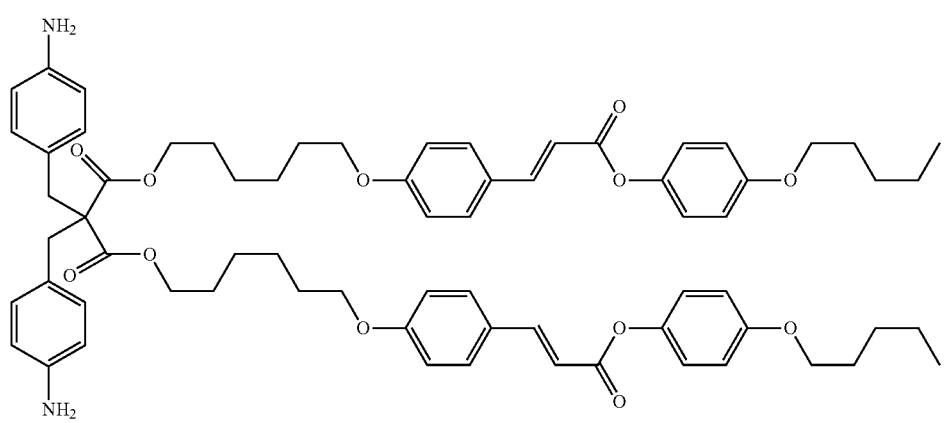
(VIII-15)
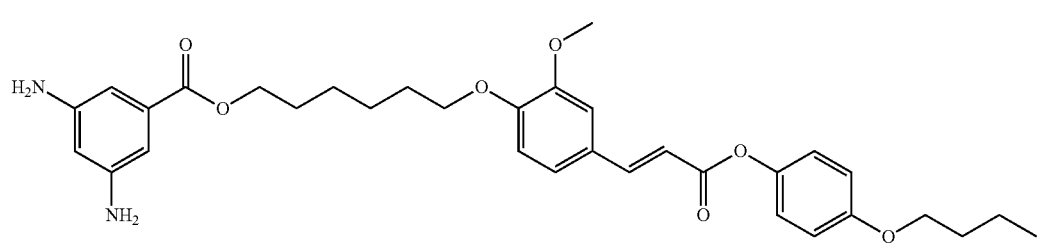
(VIII-16)

(VIII-17)

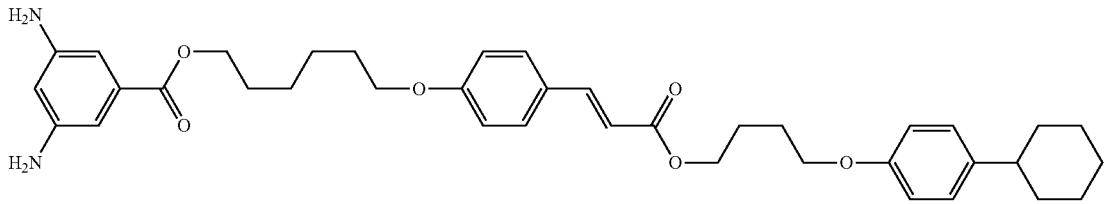

It is preferable to use the compound above.

Also, the diamine compounds having a cinnamic acid frame as the above formulae (1) to (5) can be dimerized in response to light, so that they are preferably used as the photoresponsive dimerization type polymer.

As to the photoresponsive decomposition type polymer, the light to be used for the cutting the molecular chain is preferably of 200 to 400 nm; in particular, it is more preferably of 200 to 280 nm; it is further preferable to be 240 to 280 nm.

It is preferable that the photoresponsive isomerization type polymer of the present invention can be prepared by synthesis of tetracarboxylic dianhydride with a diamine compound, and that at least one of the tetracarboxylic dianhydride and the diamine has a diazo bond.

The tetracarboxylic dianhydride having a diazo bond can include the compound represented by following formula (1-8).

[Formula 22]

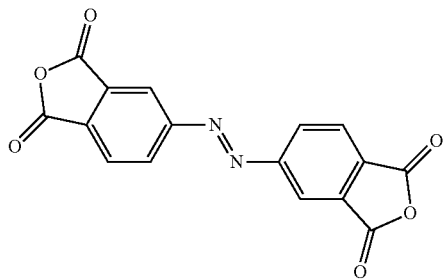
(1-8)

Also, the diamine having a diazo bond can include the following formulae (I-1) to (I-7):

[Formula 23]

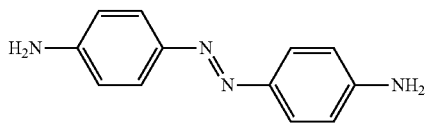
(I-1)

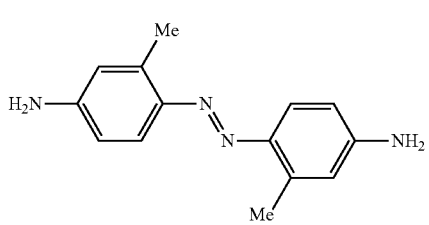
(I-2)

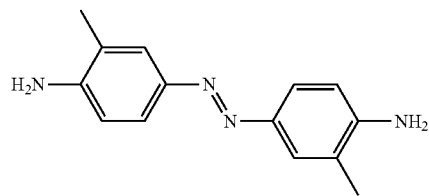
(I-3)

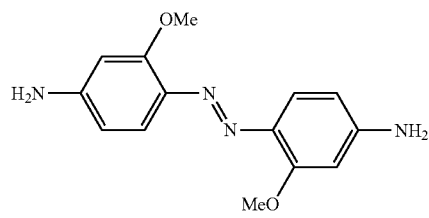
(I-4)

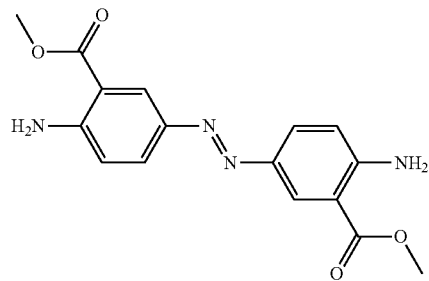
(I-5)

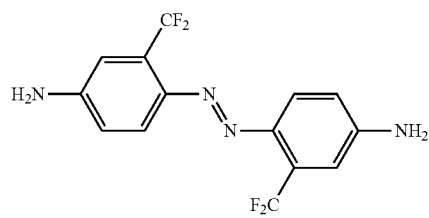
(I-6)

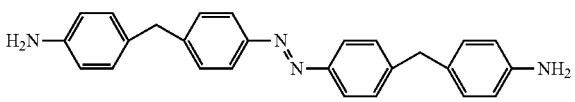
(I-7)

The compounds above are exemplified.

Therefore, as a preferable embodiment of the photoresponsive isomerization type polymer of the present invention, when a compound as a diamine having a diazo bond is selected from the formulae (I-1) to (I-7), it is preferable that a compound as the tetracarboxylic dianhydride is from the groups represented by formula (1-8) and formulae (A-1) to (A-43). On the other hand, as a preferable embodiment of the photoresponsive isomerization type polymer of the present invention, when a compound selected as the tetracarboxylic dianhydride having a diazo bond is formula (1-8), it is preferable that a compound as the diamine compound is selected from the compounds represented by formulae (I-1) to (I-7) and formulae (III-1) to (VIII-11), (I) and (1) to (5).

As to the photoresponsive isomerization type polymer, the light to be used when isomerized in response to light and oriented in nearly vertical direction with respect to the polarization axis is preferably of 200 to 500 nm; in particular, it is more preferably of 300 to 500 nm; it is further preferable to be 300 to 400 nm.

The weight average molecular weight of the photoresponsive decomposition type polymer of the present invention is preferably 3,000 to 30,000; it is more preferably 5,000-100,000; it is more preferable 10,000-50,000; and specifically, it is more preferably 10,000-30,000.

The weight average molecular weight of the photoresponsive isomerization type polymer of the present invention is preferably 10,000 to 800,000; it is more preferably 10,000-400,000; it is yet more preferably 50,000-400,000; and in particular, it is more preferably 50,000-300,000.

The weight average molecular weight of the photoresponsive dimerization type polymer of the present invention is preferably 5,000 to 800,000; it is more preferably 6,000-400,000; it is yet more preferably 100,000-400,000; and in particular, it is more preferably 100,000-300,000.

The weight average molecular weight (Mw) as mentioned above are obtained by a measurement result of GPC (gel permeation chromatography).

The concentration of the photoresponsive polymer solution of the present invention is preferably 1 to 20 mass %; and more preferably 2-10 mass %; and yet more preferably 2 to 5 mass %.

"Process (II)"

The process (II) of the present invention is to coat the photoresponsive polymer solution on a substrate, followed by drying at 50 to 100° C. for 1 to 3 minutes and then drying at 120° C. to 180° C. for 5 to 75 minutes to form a coating.

As a result, there can obtain the effects that a photoresponsive polymer film having a homogeneous film thickness can be formed.

It is preferable that the average thickness of the coating film of the present invention is 1 to 1,000 nm; and in particular, it is more preferable that it is 5 to 500 nm; and it is further preferable that it is 10 to 200 nm; and it is yet further preferable that it is 20 to 90 nm.

The method for measurement of the average thickness of the coating film of the present invention is a measurement of difference in level by using a contact type film thickness meter which is carried out after the application of light alignment film and the light irradiation. Also, the method for measuring the average film thickness of the liquid crystal alignment film obtained by the manufacturing method of the present invention is the same.

The substrate to be used in present invention is preferably a transparent substrate. Considering the relationship with the solvent used for the photoresponsive polymer solution, so long as it is a material that does not dissolve in the solvent, it is not particularly limited. The example thereof can include glass substrate or quartz substrate.

Also, the coating method of the present invention can include spin coat method, bar coating method, flexographic printing method, and ink-jet method.

The drying method of the coating film of the present invention can include heat drying and vacuum drying.

The dry condition of the present invention is as follow. It is preferable to heat at 20 to 150° C. for 0.1 to 20 minutes followed by heating at 80° C. to 250° C. for 1 to 100 minutes; or it is preferable to heat at 30 to 120° C. for 0.5 to 10 minutes followed by heating at 100° C. to 200° C. for 2 to 90 minutes; or it is preferable to heat at 50 to 100° C. for 1 to 3 minutes followed by heating at 120° C. to 180° C. for 5 to 75 minutes; or it is preferable to heat at 70 to 90° C. for 2 to 3 minutes followed by drying at 150° C. to 180° C. for five minutes.

Regarding the number of drying of the coating film of the present invention, it is preferable to do one time or more and five times or less. It is more favorable to do one time or more and three times or less.

"Process (III)"

The process (III) of the present invention to adjust the temperature of the coating film at 40° C. to 100° C. while irradiating light of 200 to 350 nm.

According to the manufacturing method of the present invention, by adjusting the temperature of the coating film at the time of the light irradiation, it is considered that the change of the molecular structure is promoted such that the effect of improvement of the anchoring power can be exhibited. Particularly, when the photoresponsive dimerization type polymer as mentioned above is used as the photoresponsive polymer, it has been found that the dimerization can be promoted by controlling the temperature of the coating film at a specific range at the time of the light irradiation.

Also, when the drying process is carried out as the process (II) followed by performing the process (III), it has been found that the dimerization can be promoted more than the manufacturing method where the drying process is not carried out.

In the present invention, the method to adjust the temperature of the coating film is preferably performed by employing a maintenance means, e.g., by heating on a hot plate or applying polarized light irradiation inside a constant temperature bath.

In a process (III), it is preferable to irradiate the coating film with light of 200 to 350 nm in a state where the temperature of the coating film is maintained at 38° C. to 110° C.; and it is further preferable to irradiate the coating film with light of 230 to 340 nm in a state where the temperature of the coating film is maintained at 40° C. to 100° C.; and it is yet further preferable to irradiate the coating film with light of 250 to 330 nm in a state where the temperature of the coating film is maintained at 50° C. to 90° C.; it is particularly preferable to irradiate the coating film with light of 270 to 330 nm in a state where the temperature of the coating film is maintained at 65° C. to 75° C.

The light irradiation in the process (III) to of the present invention can give the coating film a liquid crystal orientation ability. For example, ultraviolet rays and visible rays including light having a wavelength of 150 nm to 800 nm can be employed. Among these, it is preferable to use ultraviolet rays including light having a wavelength of 200 nm to 350 nm. Also, the light to be irradiated can be polarized light or unpolarized light. Furthermore, in case of polarized light, it can be linear polarized light or partially polarized light. In addition, in the specification of the present application, the term "unpolarized light" shall include light that is partly polarized, if it is substantially unpolarized light.

It is preferable that the light to irradiate the coating film in the process (III) of the present invention is preferably linear light, and also it is more preferable that it is linear polarized light. Also, in case of linear polarized light or partially polarized light, the irradiation can be performed from the direction perpendicular to the substrate surface, or alternatively it can performed from a slant direction in order to give a pretilt angle, or a combination of both can be performed. When unpolarized light is irradiated, the irradiation direction is required to be a slant direction. In addition, the term "pretilt angle" in the specification of the present application means an angle of the inclination of the liquid crystal molecule from the direction parallel to the substrate surface.

As a source of the light to be used in the present invention, the example thereof can include low pressure mercury lamp, high pressure mercury lamp, super high pressure mercury lamp, deuterium lamp, metal halide lamp, argon resonance lamp, xenon lamp, excimer laser mercury xenon lamp (Hg—Xe lamp). The ultraviolet rays of linear polarized light or partially polarized light is preferably provided by means of e.g., using a light source thereof along with a filter, a diffraction grating, and etc.

An exposure dose of the light in the present invention is preferably 1 mJ/m$^2$ to 1,000 mJ/m$^2$; it is more preferable that it is 5 mJ/m$^2$ to 1,000 mJ/m$^2$; and it is further preferable that it is 10 mJ/m$^2$ to 500 mJ/m$^2$; and it is specifically preferable that it is 10 mJ/m$^2$ to 100 mJ/m$^2$.

If a liquid crystal orientation ability is given to a coating film formed from a liquid crystal orientation agent by means of a light orientation method as conventionally known, a light exposure doses of more than about 1,000 mJ/m$^2$ is required. However, by using the manufacturing method of the present invention, it is possible to reduce the light exposure dose at the light orientation method to a level of 10 to 100 mJ/m$^2$ or less. Therefore, good liquid crystal orientation ability can be given with production cost saving. In addition, the yellowing of the orientation film through the light irradiation can be decreased, as well.

Also, in the liquid crystal alignment film obtained by the manufacturing method of the present invention, it is preferable that the liquid crystal molecule is oriented in nearly horizontal direction with respect to the substrate. When the liquid crystal alignment film provided in the manufacturing method of the present invention is applied to a horizontal electric field type liquid crystal display element such as FFS mode and IPS mode as described later, an anchoring effect can be evenly and uniformly given even to such a horizontal electric field type liquid crystal display element which has an electrode structure with a number of surface irregularities. In addition, the orientation can be uniform without defects, thereby increasing a contrast.

A particularly preferable embodiment of the process (III) of the present invention is to irradiate the substrate of the present invention with a linear light of 200 to 350 nm from nearly a vertical direction thereof at a condition that the exposure dose of the linear polarized light is 10 to 100 mJ/cm$^2$.

Also, as the light irradiation from nearly vertical direction above, it is preferable to irradiate the substrate from the direction at an angle of 70 to 110 degrees.

The second aspect of the present invention is a method of orientating a liquid crystal composition, comprising: a process (I) of mixing a solvent with a photoresponsive dimerization polymer to prepare a photoresponsive dimerization polymer solution, the photoresponsive dimerization polymer forming a crosslinked structure by dimerization between side chains in response to light; a process (2) of forming a coating film of the photoresponsive dimerization polymer solution on surfaces of a first substrate and a second, followed by drying at 50 to 100° C. for 1 to 3 minutes and then drying at 120° C. to 180° C. for 5 to 75 minutes to dry the coating; a process (3) of irradiating with a polarized light of 200 to 350 nm in a state where a temperature of the coating film is maintained at 50° C. to 100° C., so as to form a liquid crystal alignment film on the surfaces of the first substrate and the second substrate; and a process (3) of filling a liquid crystal composition between a pair of the liquid crystal alignment films such that said pair of the liquid crystal alignment films are laminated with a space therebetween, As a result, there can obtain an effect to improve the anchoring power.

<Liquid Crystal Display Element>

The third aspect of the present invention is a liquid crystal display element provided with the liquid crystal alignment film of the present invention.

As the liquid crystal display element of the present invention, the examples useful can include ECB-LCD, VA-LCD, VA-IPS-LCD, FFS-LCD, TN (nematic liquid crystal display element), STN-LCD (super twisted nematic liquid crystal display element), OCB-LCD and IPS-LCD (in-plane switching liquid crystal display element), but it is particularly useful for FFS-LCD, IPS-LCD, and can be used as a transmission type or reflection type liquid crystal display element.

Two substrates of a liquid crystal cell used in the liquid crystal display element can be made of transparent material having flexibility, such as glass or resin material, and one of the substrates may be made of opaque material such as silicon. A transparent substrate having a transparent electrode layer can be made by, for example, sputtering indium tin oxide (ITO) on a transparent substrate such as a glass plate.

The color filter can be produced by, for instance, a pigment dispersion method, a printing method, an electrode-position method, or a staining method. As one example, a production method of a color filter by a pigment dispersion method is explained here. A curable color composition used for a color filter is coated on the transparent substrate, and subject to a pattering treatment, which is then cured by heating or photo irradiation. This process is carried out with respect to each of three colors, i.e., red, green and blue, thereby forming pixels of the color filter. In addition, the surface of the substrate can be provided with an active element such as a TFT and thin-film diode, serving a pixel electrode.

After the liquid crystal alignment film is formed on the transparent substrate having transparent electrode layer and/or on the transparent substrate surface in accordance with the manufacturing method of the present invention, the substrates are arranged such that the transparent electrode layers are disposed inside (i.e., such that the liquid crystal alignment films face each other). In this case, a spacer can be disposed to adjust the distance between the substrates. In this case, it is preferable that the thickness of a light modulating layer (i.e., liquid crystal layer) as obtained is in a range of 1-100 μm. It is further preferable that it is in a range of 1.5 to 10 μm. In the case where a polarizing plate is used, it is preferable to adjust the product of the refractive index anisotropy Δn of the liquid crystal and the cell thickness G in order to achieve a maximum contrast. Also in the case where there are two polarizing plates, the polarization axis of each polarizing plate can be adjusted to provide a favorable view angle or contrast. Furthermore, a retardation film can be used to increase a view angle. The example of the spacer can include a columnar spacer made of, for instance, glass particles, resin particles, alumina particles and photoresist materials. Then, a sealing material such as an epoxy thermosetting composition is applied to the substrates by means of screen printing while a liquid crystal injection port is formed. The substrates are laminated to each other such that the liquid crystal alignment films are facing to each other, and then, subjected to heat curing of the sealing material through heating.

As a method to interpose the liquid crystal composition (which can further include a polymerizable compound, if necessary) between the two substrates, a general method such as a vacuum injection method and an ODF method can be used. However, in a vacuum injection method, although drop marks are not generated, this method has a problem in that an mark at the injection is left. In the present invention, it can be further preferable when using the ODF method to produce a liquid crystal composition. In a process for manufacturing a liquid crystal display element by means of an ODF method, a sealing material such as an optically thermally curable epoxy based material is applied to either one substrate of the back plane and the front plane by using a dispenser such that a wall in a shape of a closed loop is drawn, into which a certain amount of the liquid crystal composition is dropped under a vacuum condition, thereby bonding the front plane with the back plane to manufacture a liquid crystal display element. It is preferable to use the ODF method process since the liquid crystal composition of the present invention can be stably dropped.

The liquid crystal display element using the liquid crystal composition of the present invention is useful in accomplishing both the high speed response and the restraint of the display defectiveness. It is particularly useful for a liquid crystal display element of active matrix driving, and applicable to liquid crystal display elements of VA mode, PSVA mode, PSA mode, IPS (in-plane switching) mode, VA-IPS mode FFS (fringe field switching) mode and ECB mode.

Next, a favorable embodiment of the liquid crystal display element of the present invention (i.e., one example of liquid crystal display) is described with reference to the drawings.

FIG. 1 is a cross-sectional view of a liquid crystal display element including two substrates opposed to each other, a sealing material disposed between the substrates, and liquid crystal confined in the sealed region surrounded by the sealing material.

In details, FIG. 1 illustrates an embodiment of a liquid crystal display element which includes a back plane in which a first substrate 100 is provided with TFT layers 102 and pixel electrodes 103 formed thereon, onto which a passivation film 104 and a first alignment film 105 are provided; a front plane opposed to the back plane, the front plane including a second substrate 200 which is provided with a black matrix 202, a color filter 203, a planarization film (overcoat layer) 201, and transparent electrode 204, onto which a second alignment layer 205 is provided; a sealing material 301 disposed between the substrates; and a liquid crystal layer 303 confined in a sealed region surrounded by the sealing material, in which the substrate surface contacting the sealing material 301 is provided with protrusions (columnar spacer) 302, 303.

So long as the first substrate or the second substrate is made of substantially transparent material, there is no specific limitation, and it can be of glass, ceramic materials, and resin materials to be used. The resin substrate can include cellulose and cellulose derivative such as triacetylcellulose and diacetyl cellulose; polycycloolefin derivative, polyester such as polyethylene terephthalate and polyethylenenaphthalate; polyolefin such as polypropylene and polyethylene; polycarbonate, polyvinyl alcohol, polyvinyl chloride, polyvinylidene chloride, polyamide, polyimide, polyimide amide, polystyrene, acrylics, polymethyl methacrylate, polyethersulfone, and polyarylate, and furthermore, inorganic-organic composite material such as fiberglass-epoxy resin, fiberglass-acrylic resin.

In the case where a resin substrate is used, a barrier film is preferably provided. The barrier film serves to reduce the moisture permeability of the resin substrate, thereby improving the reliability of the electric properties of the liquid crystal display element. As the barrier film, any material having high transparency and low water vapor permeability can be used. Generally, it can be a thin film formed from an inorganic material such as silicon oxide by means of vapor deposition, sputtering, or a chemical vapor deposition method (CVD method).

In the present invention, the first substrate and the second substrate can be made of the same material as, or different material from each other, and there is no specific limitation. Using a glass substrate is preferable since a liquid crystal display element with excellent thermal resistance and dimensional stability can be produced. Alternately, using a resin substrate is preferable since it is suitable for a manufacturing method through a roll-to-roll process, and appropriate to accomplish the improvements of light weight and flexibility. Also, if focusing on imparting flatness and thermal resistance, a combination of a resin substrate and a glass substrate can bring good results.

In the Examples described later, a glass substrate is used as the first substrate 100 or the second substrate 200.

In the back plane, the first substrate 100 is provided with TFT layers 102 and pixel electrodes 103 thereon. These components are formed through an array process which is generally used. Onto this, the passivation film 104 and the alignment film 105 are formed to obtain the back plane.

The passivation film 104 (which is also called as an inorganic protective film) is a film to protect the TFT layers. Generally, it is a nitride film (SiNx), an oxide film (SiOx) and etc. formed by means of a chemical vapor deposition (CVD) technique.

The first liquid alignment film 105 and the second liquid alignment film 205 are the films serving to align the liquid crystal molecules obtained by the manufacturing method of the liquid crystal alignment film of the present invention. The alignment film can deteriorate the adhesion of the sealing material to the alignment film so that it is coated in a pattern inside the sealed region.

Also, for the reaction mechanism to induce the photo alignment method of the present invention, a group which causes a photo reaction bringing about the liquid crystal alignment (which is hereinafter referred to as photo alignment group) can be used, which can include molecule alignment inducement by means of Weigert's effect due to photodichroism (isomerization reaction) (e.g., azobenzene group), a dimerization reaction (e.g., cinnamoyl group), or a photolysis reaction (e.g., polyimide group). In particular, it is preferable to use a dimerization reaction to form a photo alignment film. After the coated alignment agent solution is temporarily dried to evaporate the solvent, it is preferable that by controlling the temperature of the coating film when the product is irradiated with light having a certain polarization (polarized light), an alignment film can be provided with an alignment ability in any direction.

In the one substrate, i.e., the front plane, there are the black matrix 202, the color filter 203, the planarization film 201, the transparent electrode 204, and the second alignment film 205 formed on the second substrate 200.

The black matrix 202 is formed by, for example, a pigment dispersion method. In details, on the second substrate 200 having provided the barrier film 201, there is applied a color resin liquid in which a black colorant has been uniformly dispersed for the purpose of forming the black matrix, thereby forming a colored layer. Then, the colored layer is cured by baking. A photoresist is applied onto the cured layer and then subject to a preliminary baking. The photoresist is exposed to light through a mask pattern, and then, developed to make pattern the colored layer. Then, the photoresist layer is removed, and the colored layer is baked to complete the formation of the black matrix 202.

Alternatively, a photoresist type pigment dispersion liquid can be used. In this case, a photoresist type pigment dispersion liquid is applied and preliminarily baked, which is followed by being exposed with light through a mask pattern, and then developed to pattern the colored layer. Then, the photoresist layer is removed, and the colored layer is baked to complete the formation of the black matrix 202.

The color filter 203 is formed by means of a pigment dispersion method, an electrodeposition method, a printing method, or a staining method. In the pigment dispersion method, for example, a color resin solution in which a pigment (e.g., red) has been uniformly dispersed is applied onto the second substrate 200 and then cured by baking, onto which a photoresist is applied and preliminarily baked. The photoresist is exposed with light through a mask pattern, then developed, to carry out patterning. Then, the photoresist layer is removed, and it is baked again, thereby completing the formation of a (red) color filter 203. The color filters can be formed in any order with respect to the colors. In the same manner, a green color filter 203 and a blue color filter 203 are formed.

The transparent electrode 204 is formed on the color filter 203 (if necessary, the overcoat layer (201) is optionally formed on the color filter 203 to flatten a surface). The transparent electrode 204 preferably has a higher light transmittance and lower electric resistance. In formation of the transparent electrode 204, an oxide film of, for example, ITO is formed by sputtering.

Also, for the purpose to protect the transparent electrode 204, a passivation film can be formed on the transparent electrode 204 in some cases.

The second alignment film 205 is the same as the first alignment film 105 as mentioned above.

As explained above, while the details of the specific embodiment of the back plane and front plane used in the present invention was described, the present invention is not limited to the specific embodiment. The change of the embodiment depending on a desired liquid crystal display element can be freely made.

The shape of the columnar spacer is not limited, and can have any shape. In particular, its horizontal cross section can have any shape such as a circular, a rectangular or a polygonal shape. However, its horizontal cross section preferably has a shape of a circular or a regular polygonal shape in view of margin for misalignment in the production process. Also, the protrusions preferably have a shape of truncated cone or truncated pyramid.

The material of the columnar spacer is not specifically limited, so long as it is insoluble in the sealing material, an organic solvent used in the sealing material, or the liquid crystal. In particular, in view of processability and light weight it can be preferably a synthetic resin (curable resin). By the way, the protrusion can be provided on a surface of the first substrate where it contacts the sealing material by means of a photolithography method or a droplet ejection method.

For such reasons, a photocurable resin which is suitable for the photolithography method and the droplet ejection method can be preferably used.

As an example, an explanation is made in a case where a columnar spacers are formed by means of a photolithography method. FIG. 2 illustrates processes of light exposure treatment using the pattern for producing the columnar spacers formed on the black matrix as a photo mask pattern.

A resin solution (which does not contain a colorant) used for forming the columnar spacer is coated on the transparent electrode 204 of the front plane. Then, this resin layer 402 is cured by baking. There, a photoresist is coated and then preliminarily baked. The photoresist is exposed with light through a mask pattern 401, and then developed to make a patterning of the resin layer. Then, the photo resist layer is removed, and then, the resin layer is baked to finish the formation of the columnar spacer (302, 303 of FIG. 1).

A position to form the columnar spacers can be determined as needed depending on the mask pattern. Therefore, both the inside of the sealed region of the liquid crystal display element and the outside thereof (the part where the sealing material is applied) can be simultaneously formed. Also, it is preferable that the columnar spacers are formed above the black matrix to avoid the deterioration of the quality of the sealed region. The columnar spacers formed through the photolithography method as explained above can be sometimes called as column spacer or photo spacer.

As the material of the spacer, a mixture can be used, which contains, for example, a negative water-soluble resin, such as a PVA-stilbazo photosensitive resin, a polyfunctional acrylic monomer, an acrylic acid copolymer, and a triazole-based initiator. Alternatively, there is a method in which a color rein is used, in which a colorant has been dispersed in a polyimide resin. There is no specific limitation in the present invention, and the spacer can be prepared by using known material which is suitable with the liquid crystal and the sealing material.

In such a way, the columnar spacers are formed on the surface of the front plane where it becomes a sealed region, before the sealing material (represented by the symbol 301 in FIG. 1) is coated on the surface of the back plane where the seal material contacts.

The material of the sealing material is not particularly limited. A curable resin composition can be used which is prepared by adding a polymerization initiator to an epoxy-based or acrylic-based photocurable resin, thermosetting resin, or optically and thermally curable resin. Also, fillers made of an inorganic or organic material can be added in some cases to adjust moisture permeability, elastic modulus, and viscosity. Such fillers may have any shape such as spherical shape, fibrous shape, or amorphous shape. Furthermore, a spherical or fibrous gap material having a single dispersion diameter can be mixed to favorably control the cell gap, and a fibrous material which can be easily entangled around the protrusion formed above the substrate can be mixed to enhance the adhesion to the plates. It is desirable that the diameter of the fibrous material used in this case is less than around ⅕ to 1/10 of the cell gap, and the length of the fibrous material is preferably shorter than the coating width of the sealing material.

The material of the fibrous material is not particularly limited so long as a predetermined shape can be obtained. It can be appropriately selected from synthetic fibers such as cellulose, polyamide, and polyester, and inorganic materials such as glass and carbon.

Regarding the method for coating the sealing material, it can be coated by means of a printing method or a dispensing method, but a dispensing method is prefer because of using a small amount of the sealing material. The position to coat the sealing material is set above the position of the black matrix in order to avoid adversely affecting the sealed region. In order to form a liquid crystal dropped region in the subsequent process (to prevent the liquid crystal from leaking), the shape of the sealing material is a closed loop.

A liquid crystal is dropped at the closed loop structure (sealed region) of the front plane, the closed loop structure having been formed by application of the sealing material. In general, a disperser is used. Since the amount of the liquid crystal to be dropped should be equivalent to the capacity of the liquid crystal cell, the amount is basically equal to the volume that is the product of the height of the columnar spacer and the coated area of the sealing material. However, in order to reduce the leakage of the liquid crystal during the cell bonding process or optimize the display characteristics, the amount of the liquid crystal to be dropped can be appropriately adjusted, or the positions to which the liquid crystal are dropped can be dispersed.

Then, the back plane is bonded to the front plane in which the sealing material has been coated and the liquid crystal has been dropped. In details, the front plane and the back plane are attached to a stage having a mechanism for holding a substrate, such as an electrostatic chuck, and then the front plane and the back plane are disposed at a position (in a distance) such that the second alignment film of the front plane is opposed to the first alignment film of the back plane while the sealing material does not contact the other substrate. In this state, pressure in the system is reduced. After the completion of the pressure reduction, the positions of the front plane and back plane are adjusted while the bonding parts of the front plane and the back plane are being checked (alignment process). After the bonding parts are adjusted, the substrates are moved close to each other to a position at which the sealing material on the front plane contacts the back plane. In this state, the inside of the system is filled with inert gas, and the vacuum is gradually reduced and returned to normal pressure. In this process, atmospheric pressure enables the front plane and the back plane to be bonded to each other, so as to create a cell gap with the height of the columnar spacers. In this state, the sealing material is irradiated with ultraviolet light to cure the sealing material, thereby forming the liquid crystal cell. Then, a heating process is optionally carried out to promote the curing of the sealing material. The heating process is carried out in many cases to enhance the adhesion of the sealing material and the reliability of electric properties.

Nest, favorable embodiments of the liquid crystal display element of the present invention are further explained.

A second favorable embodiment of the liquid crystal display element of the present invention is a liquid crystal display element as follows. A first substrate having an electrode layer including a first alignment layer and a thin film transistor on the surface thereof, and a second substrate having a second alignment layer on the surface thereof are disposed such that these alignment layers face each other with a gap, and that a liquid crystal layer including a liquid crystal composition is filled between the first substrate and the second substrate. The electrode layer including the thin film transistor is preferably provided with a plurality of gate wirings and data wirings arranged in a mesh shape, a thin film transistor provided at each of the intersections of the data wirings and the gate wirings, a pixel electrode connected to the thin film transistor, and a common electrode provided on the first substrate, the common electrode separated from the pixel electrode. Also, the first alignment layer and the second alignment layer provided close to the liquid crystal layer are preferably alignment films which induce a homogeneous alignment with respect to the liquid crystal composition.

Therefore, the liquid crystal display element above preferably has a structure in which a second polarizing plate, a second substrate, an electrode layer including a thin film transistor (or which can be referred to as a thin film transistor layer), a liquid crystal alignment film obtained in accordance with the manufacturing method of the present invention, a liquid crystal layer including a liquid crystal composition, an alignment film, a color filter, a first substrate, and a first polarizing plate are stacked in order.

By arranging the common electrode separate from the pixel electrode with a gap on the same substrate (or the electrode layer), the electric field (E) generated between the common electrode and the pixel electrode can be provided with a planar direction component. Therefore, for example, in a case where an alignment film which induces a homogeneous alignment with respect to the liquid crystal composition is used in the alignment layer, there can be provided an element as follows. Prior to applying a voltage between the common electrode and the pixel electrode, the liquid crystal molecules are arranged in the surface direction, that is, the alignment direction of the alignment film, to block the light; but when applying a voltage, the liquid crystal molecules are rotated horizontally due to the electric field (E) applied in the planar direction to be oriented along the electric field direction, so as to block the light.

In addition, the form of the liquid crystal display element according to the present invention can be, so-called, a color filter-on-array (COA), and a color filter can be provided between the electrode layer including a thin film transistor and the liquid crystal layer, or a color filter can be provided between the electrode layer including the thin film transistor and the second substrate.

It is noted that the term "on a substrate" in the specification of the present application includes so-called a state supported by a substrate, that is, a state not only brought into direct contact, but also brought into indirect contact, with a substrate.

More favorable another form of the second favorable embodiment of the liquid crystal display construction of the present invention (FFS) is a liquid crystal display element as follows. A first substrate having an electrode layer including a first alignment layer and a thin film transistor on the surface thereof, and a second substrate having a second alignment layer on the surface thereof are disposed such that these alignment layers face each other with a gap, and that a liquid crystal layer including a liquid crystal composition is filled between the first substrate and the second substrate. The electrode layer including the thin film transistor is preferably provided with a plurality of gate wirings and data wirings arranged in a mesh shape, a thin film transistor provided at each of the intersections of the data wirings and the gate wirings, a pixel electrode connected to the thin film transistor, and a common electrode provided on the first substrate, the common electrode separated from the pixel electrode. Here, it is preferable that the shortest distance d between the common electrode and the pixel electrode which are adjacent to each other is shorter than the shortest distance G between the alignment layers.

Also, in the specification of the present application, a liquid crystal display element satisfying the condition that the shortest distance d between the common electrode and the pixel electrode is longer than the shortest distance G between the alignment layers is called as an IPS mode liquid crystal display element, and an element satisfying the condition that the shortest distance d between the common electrode and the pixel electrode which are adjacent is shorter than the shortest distance G between the alignment layers is called as FFS. Therefore, only the condition of the FFS mode is that the shortest distance d between the common electrode and the pixel electrode which are adjacent to each other is shorter than the shortest distance G between the alignment layers, and therefore, there is no limitation to the positional relationship in the thickness direction between the surface of the common electrode and the surface of the pixel electrode. For that reason, in the liquid crystal display element of the FSS mode according to the present invention, as shown in FIGS. 3 to 9, the pixel electrode can be provided closer to the liquid crystal layer than the common electrode, or alternatively, the pixel electrode and the common electrode can be provided on the same plane.

The photo alignment film according to the present invention is preferable when it is used in a liquid crystal display element of an FFS driving system (FFS-LCD) from the viewpoint of high speed response and reduction of burn-in.

An example of further preferable embodiment of the second embodiment according to the present invention is explained below with reference to FIGS. 3 to 7. FIG. 3 is an exploded perspective view schematically showing a structure of one embodiment of a liquid crystal display element, that is, so-called an FFS mode liquid crystal display element. The liquid crystal display element 10 according to the present invention preferably has a structure in which a second polarizing plate 8, a second substrate 7, an electrode layer 3 including a thin film transistor (or which is referred to as a thin film transistor layer), an alignment film 4, a liquid crystal layer 5 including a liquid crystal composition, an alignment film 4, a color filter 6, a first substrate 2, and a first polarizing plate are stacked in order. Also, as shown in FIG. 3, the second substrate 7 and the first substrate 2 can be sandwiched between a pair of the polarizing plates 1, 8. Furthermore, in FIG. 3, the color filter 6 is provided between the second substrate 7 and the alignment film 4. Moreover, a pair of alignment films 4 which are adjacent to the liquid crystal layer 5 according to the present invention to bring into direct contact with the liquid crystal composition constructing the liquid crystal layer 5 can be formed on the (transparent) electrode (layer) 3.

Another favorable embodiment of the liquid crystal display element 10 according to the present invention can be, so-called, a color filter-on-array (COA), and a color filter 6 can be provided between a thin film transistor 3 and a liquid crystal layer 5, or a color filter 6 can be provided between the film transistor 3 and the first substrate 2.

In the FFS mode liquid crystal display element, a fringe electric field is employed. When the shortest distance d between the common electrode and the pixel electrode which are adjacent to each other is shorter than the shortest distance G between the alignment layers, a fringe electric field can be formed between the common electrode and the pixel electrode, such that the alignment in the horizontal direction and the vertical direction of the liquid crystal molecules can be efficiently used. Therefore, an FFS mode liquid crystal display element can employ an electric field in the horizontal direction, that is formed in the vertical direction with respect to the line of the pixel electrode 21, the line forming a comb tooth shape, and an electric field of a parabolic shape.

FIG. 4 is an enlarged plan view of a region II of the electrode layers 3 (or which is referred to as a thin film transistor layer 3) including the thin film transistor formed on the substrate in FIG. 3. In the vicinity of the intersection at which a gate wiring 26 and a data wiring 25 intersect each other, a thin film transistor 20 including a source electrode 27, a drain electrode 24 and a gate electrode 28 is provided in connection with the pixel electrode 21 serving as a switching element in order to supply a display signal to the pixel electrode 21. FIG. 4 shows an example having a structure in which a flat plate shaped common electrode 22 is formed on one surface with intervention of an insulating layer (not shown) on the back surface of the comb tooth shaped pixel electrode 21. In addition, the surface of the pixel electrode 21 can be covered with a protective insulating film and an alignment film layer. It is noted that in the region surrounded by a plurality of the gate wirings 26 and a plurality of the data wirings 25, a storage capacitor 23 can be provided to store a display signal supplied through the data wiring 25. Furthermore, a common line 29 is provided in parallel with the gate wiring 26. The common line 29 is connected to the common electrode 22 to supply common signal to the common electrode 22.

FIG. 5 is one example of a sectional view showing by cutting the liquid crystal display element in the direction of line III-III in FIG. 4. The first substrate 2 having formed on its surface an alignment layer 4 and the electrode layer 3 including the thin film transistor 20 (11, 12, 13, 14, 15, 16, and 17), and the second substrate 7 having formed the alignment layer 4 on its surface are disposed such that the alignment layers face each other with a predetermined interval G. Into this space, the liquid crystal layer 5 including a liquid crystal composition is filled. The gate insulating film 12 is formed on a part of the surface of the first substrate 2, the common electrode 22 is formed on a part of the surface of the gate insulating film 12, and an insulating film 18 is further formed to cover the common electrode 22 and the thin film transistor 20. In addition, the pixel electrode 21 is provided on the insulating film 18, and the pixel electrode 21 is in contact with the liquid crystal layer 5 through the alignment layer 4. Therefore, the minimum distance d between the pixel electrode and the common electrode can be adjusted as an (average) film thickness of the gate insulating film 12. In other words, in the embodiment shown in FIG. 5, the distance between the common electrode and the pixel electrode in the horizontal direction with respect to the substrate becomes 0. It is preferable that an electrode width 1 of the comb tooth shaped portion of the pixel electrode 21 and the gap width m of the comb tooth shaped portion of the pixel electrode 21 are formed in such an extent of the width that all the liquid crystal molecules in the liquid crystal layer 5 can be driven by the electric field generated.

As shown in FIGS. 3 to 7, in the case of an FFS mode liquid crystal display element satisfying the condition that the shortest distance d between the common electrode and the pixel electrode which are adjacent to each other is shorter than the shortest distance G between the alignment layers, when a voltage is applied to the liquid crystal molecules in which the long axis direction thereof is arranged to be parallel to the alignment direction of the alignment layer, an equipotential line of the parabolic electric field is formed between the pixel electrode 21 and the common electrode 22 to the upper portion of the pixel electrode 21 and the common electrode 22, and therefore, the liquid crystal molecules in the liquid crystal layer 5 are rotated in the liquid crystal layer 6 along the electric field formed so as to serve as a switching element. In more detail, for example, in a case where an alignment film which induces a homogeneous alignment with respect to the liquid crystal composition is used in the alignment layer, prior to applying a voltage between the common electrode and the pixel electrode, the liquid crystal molecules arranged in the surface direction which corresponds to the alignment direction of the alignment film can block the light; and when a voltage is applied, an electric field of a planar direction component is generated since the common electrode and the pixel electrode are provided on the same substrate (or an electrode layer) with a gap, and an electric field (fringe electric field) of a vertical direction component is generated as derived from the edge of these electrodes since the shortest distance d between the common electrode and the pixel electrode which are adjacent to each other is shorter than the shortest distance G between the alignment layers, and therefore, even liquid crystal molecules having a low dielectric anisotropy can be driven. Therefore, an amount of a compound having a high dielectric anisotropy ($\Delta\in$) can be significantly reduced in the liquid crystal composition, so that the liquid crystal composition can contain a large amount of compound having a low viscosity.

Furthermore, the alignment film obtained by the manufacturing method of the present invention can exhibit a high anchoring effect, so that there are many kinds of liquid crystal compositions that can be used. Therefore, even a liquid crystal composition having relatively a low dielectric constant, that can be used, can be driven.

There is another embodiment (FFS) as the second favorable embodiment of the liquid crystal display construction of the present invention, that is, a liquid crystal display element favorably as follows. A first substrate having an electrode layer including a first alignment layer and a thin film transistor on the surface thereof, and a second substrate having a second alignment layer on the surface thereof are disposed such that these alignment layers face each other with a gap, and that a liquid crystal layer including a liquid crystal composition is filled between the first substrate and the second substrate. The electrode layer including the thin film transistor is preferably provided with a common electrode, a plurality of gate wirings and data wirings arranged in a mesh shape, a thin film transistor provided at each of the intersections of the data wirings and the gate wirings, a pixel electrode connected to the thin film transistor. In addition, the pixel electrode is protruded more than the common electrode at the side of the second substrate. Also, the first alignment layer and the second alignment layer provided close to the liquid crystal layer are preferably alignment films which induce a homogeneous alignment with respect to the liquid crystal composition.

FIG. 6 is another form of an enlarged plan view of a region II of the electrode layers 3 (or which is referred to as a thin film transistor layer 3) including the thin film transistor formed on the substrate in FIG. 3. In the vicinity of the intersection at which a gate wiring 26 and a data wiring 25 intersect each other, a thin film transistor 20 including a source electrode 27, a drain electrode 24 and a gate electrode 28 is provided in connection with the pixel electrode 21 serving as a switching element in order to supply a display signal to the pixel electrode 21. In addition, the pixel electrode 21 can be of a hollowed structure having at least one notch part, and showing one example in FIG. 6 in this respect. The pixel electrode 21 has a shape in which a rectangular flat plate body is hollowed at the central portion and both ends thereof by triangular notch portions, and the remaining region thereof is hollowed by eight pieces of rectangular notch portions, while providing with the common electrode 22 as a comb tooth body (not shown). In addition, the surface of the pixel electrode can be covered with a protective insulating film and an alignment film layer. In the region surrounded by the plurality of gate wirings 25 and the plurality of data wirings 24, a storage capacitor 23 for storing a display signal supplied through the data wiring 24 can be provided. Moreover, the shape and the number of the notch portions above are not particularly limited.

FIG. 7 is one example of another form of a sectional view obtained by cutting the liquid crystal display element of FIG. 6 at the same position in the III-III direction in the same manner as FIG. 4. Here, there can be found a difference from the structure of the liquid crystal display element in FIG. 5, as follow. In the liquid crystal display element shown in FIG. 5, the common electrode is a flat plate body, and the pixel electrode is a comb tooth body. On the other hand, as described above, in the liquid crystal display element shown in FIG. 7, the pixel electrode 21 has a shape in which a rectangular flat plate body is hollowed at the central portion and both ends thereof by triangular notch portions, and the remaining region thereof is hollowed by eight pieces of rectangular notch portions, while providing with the common electrode as a comb tooth body structure. Therefore, the minimum distance d between the pixel electrode and the common electrode is an (average) film thickness of the gate insulating film 12 or larger, and less than the distance G between the alignment layers. Also in FIG. 7, the common electrode has a comb tooth body structure, but this embodiment can be provided with the common electrode of a flat plate body. Also, in any event, the FFS mode liquid crystal display element of the present invention can only have to satisfy the condition that the shortest distance d between the common electrode and the pixel electrode which are adjacent to each other is shorter than the shortest distance G between the alignment layers. Furthermore, in the configuration of the liquid crystal display element shown in FIG. 7, the pixel electrode 21 is covered with the protective film 18, whereas in the configuration of the liquid crystal display element shown in FIG. 5, the pixel electrode 21 is covered with the alignment layer 4. In the present invention, the pixel electrode can be covered with either the protective film or the alignment film.

Also in FIG. 7, a polarizing plate is formed on one surface of the first substrate 2, and the gate insulating film 12 is formed such that it covers the comb tooth shaped common electrode 22 formed on a part of the other surface, and the pixel electrode 21 is formed on a part of the surface of the gate insulating film 12, and further the insulating film 18 covering the pixel electrode 21 and the thin film transistor 20 is formed. Also, an alignment layer 4, a liquid crystal layer 5, an alignment layer 4, a color filter 6, a second substrate 7, and a polarizing plate 8 are stacked on the insulating film 18. Therefore, the minimum distance d between the pixel electrode and the common electrode can be adjusted by positions of both electrodes, the electrode width 1 of the comb tooth shaped portion of the pixel electrode 21, or the gap width m of the comb tooth shaped portion of the pixel electrode 21.

As shown in FIG. 7, the pixel electrode protrudes to the site of the second substrate compared to the common electrode, and both are provided in parallel on the first substrate. Therefore, an electric field of a planar direction component is formed between the common electrode and the pixel electrode. In addition, there is a difference in the height of the surface of the pixel electrode from the height of the surface of the common electrode in the thickness direction. Thus, an electric field (E) in the thickness direction component can also be applied at the same time.

In addition, an FFS mode liquid crystal display element employs a fringe electric field. It is not particularly limited as long as it satisfies a condition that the shortest distance d between the common electrode and the pixel electrode which are adjacent to each other is shorter than the shortest distance G between the alignment layers. Therefore, for example, the liquid crystal display element can have a configuration in which a plurality of teeth portions of the comb tooth shaped pixel electrode are provided as being engaged with a plurality of teeth portions of the comb tooth shaped common electrode with a gap. In this case, when the distance between the teeth portion of the common electrode and the teeth portion of the pixel electrode is made shorter than the shortest distance G between the alignment layers, the fringe electric field can be employed.

When the alignment film obtained by the manufacturing method of the liquid crystal alignment film of the present invention is used in an FFS mode liquid crystal display element, a high anchoring effect can be exhibited, and therefore, an effect of reducing the burn-in can be exhibited.

In the structure of a third embodiment of the present invention, a color filter 6 is preferably formed on the same substrate side as the first substrate having formed the electrode layer 3 including a thin film transistor thereon. The form is generally called as a color filter-on-array (COA) or the like. The detailed structure is explained with reference to FIGS. 8 and 9. FIG. 8 is another form of a sectional view obtained by cutting the liquid crystal display element in the direction of the line III-III in FIG. 4. In the structure of the liquid crystal composition, the first substrate 2 having formed an alignment layer 4, a thin film transistor 20 (11, 13, 15, 16, and 17), a color filter 6, and a pixel electrode 21 on the surface. The second substrate 7 having formed an alignment layer 4 and a common electrode 22 are formed on the surface. The first substrate 2 and the second substrate 7 are disposed such that the alignment layers face each other with a gap. The liquid crystal layer 5 including a liquid crystal composition is filled in this space. In addition, the thin film transistor 20 or the gate insulating film 12 is formed on a part of the surface of the first substrate 2. A buffer layer 30, that is, a flat film, is formed to cover the thin film transistor 20. The color filter 6, the pixel electrode 21, and the alignment layer 4 are stacked on the insulating layer 30 in order. Therefore, the color filter 6 is not there on the second substrate 7 unlike FIG. 5.

In addition, the liquid crystal display element has a display region R1 of a rectangular shape positioned at the central portion and a non-display region R2 of a frame shape positioned along the peripheral portion of the display region. In the display region R1, a red, green, or blue color filter is formed. In more detail, the peripheral portion of the color filter is disposed to overlap the signal lines (e.g., data wiring, or gate wiring).

A plurality of pixel electrodes 21 formed of a transparent conductive film such as ITO (indium tin oxide) is provided on the color filter. Each pixel electrode 21 is connected to the corresponding thin film transistor through the insulating film 18 and through holes (not shown) formed in each coloration layer. In more detail, the pixel electrode 21 is connected to the thin film transistor through the contact electrode described above. A plurality of columnar spacers (not shown) or the like can be provided on the pixel electrode 21. The alignment film 4 is formed on the color filter and the pixel electrode 21.

FIG. 9 is a view showing a color filter-on-array having a form different from from FIG. 8, and showing an enlarged portion of the thin film transistor 20 and the substrate 2 in FIG. 8. FIG. 8 shows a configuration in which the color filter is present at a portion closer to the liquid crystal layer than the thin film transistor, whereas the embodiment of FIG. 9 has a configuration in which the thin film transistor is present at a portion closer to the liquid crystal layer than the color filter, and the thin film transistor and the color filter are bonded through a buffer layer.

EXAMPLES

Synthesis Method of Polymer Light Alignment Material

Synthesis Example 1

[Formula 24]

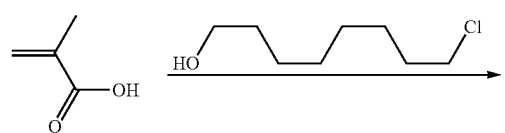

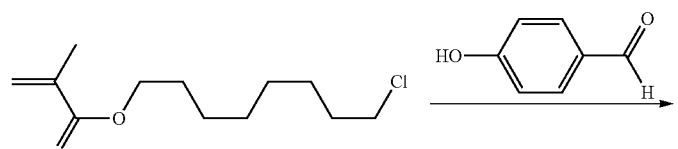

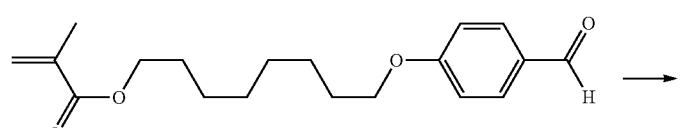

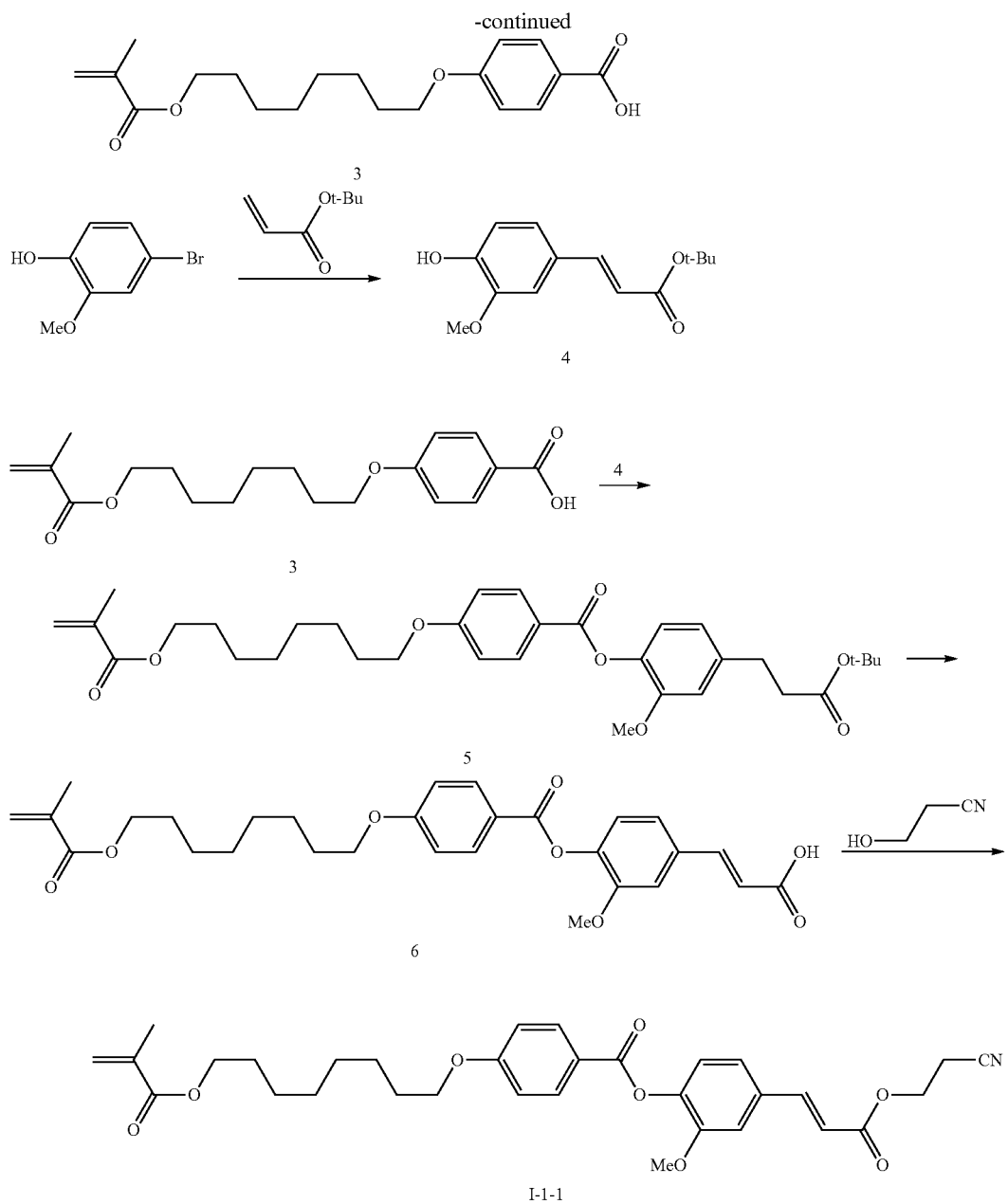

Synthesis of the Compound of Formula 1

[Formula 25]

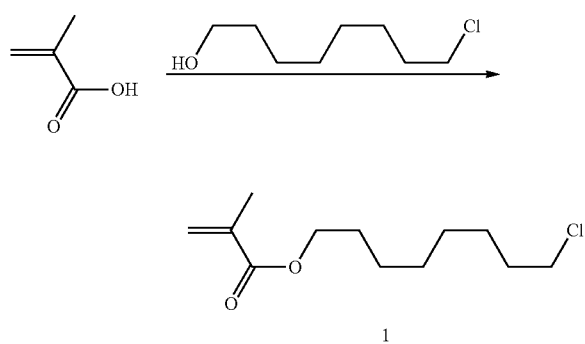

199 g (1.21 mol) of 8-chlorooctanol, 158.3 g (1.84 mol) of methyl methacrylate, 1.5 g of 4-methoxy phenol, 22.8 g (0.1.2 mol) of p-toluenesulfonic acid were dissolved in 450 ml of cyclohexane, followed by heating to reflux for six hours. The reaction liquid was cooled to room temperature, and then the solution was washed with water three times, and then it was washed with a saturated sodium bicarbonate aqueous solution three times, and then it was washed with a saturation salt solution twice. The solution was dried with sulfuric anhydrite sodium, and then, the solvent was distilled away to obtain 258 g of the compounds of formula 1 as a colorless and transparent liquid. A purity: 99% (GC). M+232.

Synthesis of the Compound of Formula 2

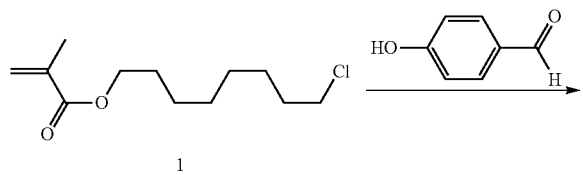

1

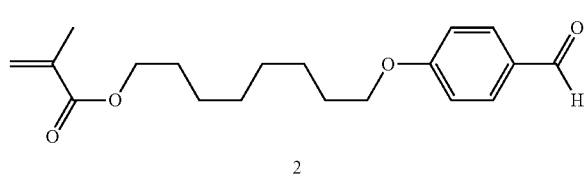

2

34.6 g (0.284 mol) of 4-hydroxy benzaldehyde and 49 g (0.341 mol) of potassium carbonate were dissolved in 500 mL of dimethylformamide, into which 58 g (0.284 mol) of 8-chlorooctyl methacrylate were added at room temperature at a nitrogen atmosphere. The reaction liquid was heated to 90 degrees while stirring it for six hours. After confirming by GC that the reaction was completed, the reaction liquid was cooled to room temperature and then, a filtration was performed. 200 ml of ethyl acetate and 200 ml of water were added, and a filtration was conducted again. The organic layer and the aqueous layer were separated from each other, and ethyl acetate was added to the aqueous layer, and an extraction was repeated three times. All the organic layers were gathered, which was washed with a saturated salt solution three times. Anhydrous sodium sulfate was added to the organic layer, which was then dried, and then, the solvent was distilled away to obtain a crude state of the compound of formula 2. The compound of formula 2 as obtained was used in the next reaction without performing any special purification. M+318.

Synthesis of the Compound of Formula 3

[Formula 27]

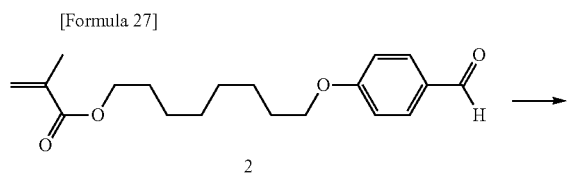

2

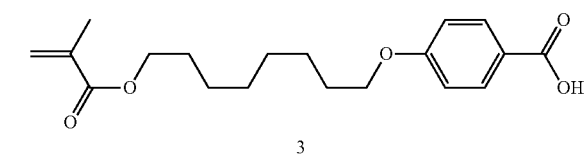

3

50 g (approximately 0.14 mol) of compound of formula 2, 4.43 g (0.029 mol) of sodium dihydrogen phosphate, and 16 g of 30% hydrogen peroxide water were dissolved in 60 ml of water and 350 ml of acetonitrile, while cooling them with ice. Then, a solution obtained by 23 g of 78% sodium chlorite diluted with 200 ml of water was dropped into the reaction liquid, which was then stirred overnight at room temperature. It was confirmed by HPLC that the reaction was completed. 10% hydrochloric acid was added to the reaction liquid to reach a pH of 1, and white solid as precipitated was filtered out. The solid as obtained was washed with water three times. The crude body 3 as obtained was dissolved in dichloromethane, into which anhydrous sodium sulfate was added to dry. Heptane was added to the solution, and the dichloromethane was distilled away at a reduced pressure, while a solid as precipitated was filtered, so as to obtained 30 g of the compound of formula 3. A purity: 99% (HPLC).

Synthesis of the Compound of Formula 4

[Formula 27]

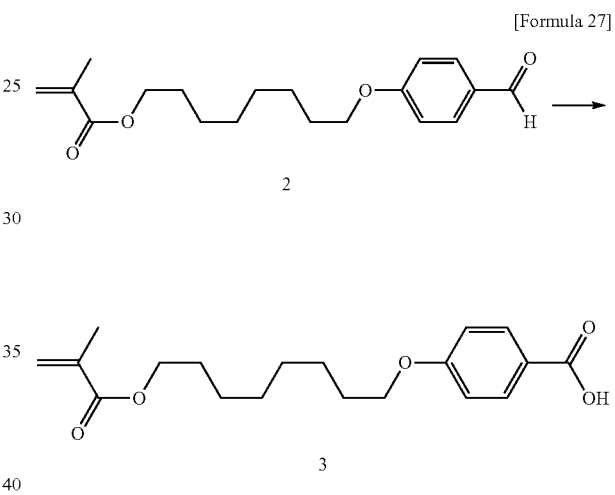

50 g (0.246 mol) of 4-bromo-2-methoxyphenol, 47.2 g (0.369 mol) of t-butyl acrylate, 50.9 g (0.369 mol) of potassium carbonate were dissolved in 700 ml of N-methylpyrrolidon, and the system was replaced with nitrogen. 0.055 g (0.246 mmol) of palladium acetate was added to the reaction liquid, and the replacement with nitrogen was again conducted, and the system was stirred at 130 degrees for six hours. It was confirmed by HPLC that the reaction was completed. The reaction liquid was cooled to room temperature, and then, 300 ml of ethyl acetate and 300 ml of 5% hydrochloric acid were added therein. The organic layer and the aqueous layer were separated from each other, and ethyl acetate was added to the aqueous layer, and an extraction was repeated three times. All the organic layers were gathered, which was washed with a saturated salt solution three times. The solvent was distilled away, and then 80 g of silica gel was added to make a slurry. This was filled into an 100 g of alumina/300 g silica gel column, and it was eluted with ethyl acetate/heptane mixture. The solvent was distilled away, and a crude crystal obtained was recrystallized with heptane to obtain 43.2 g of the compound of formula 4 as a white solid. A purity: 99% (HPLC). M+250.

Synthesis of the Compound of Formula 5

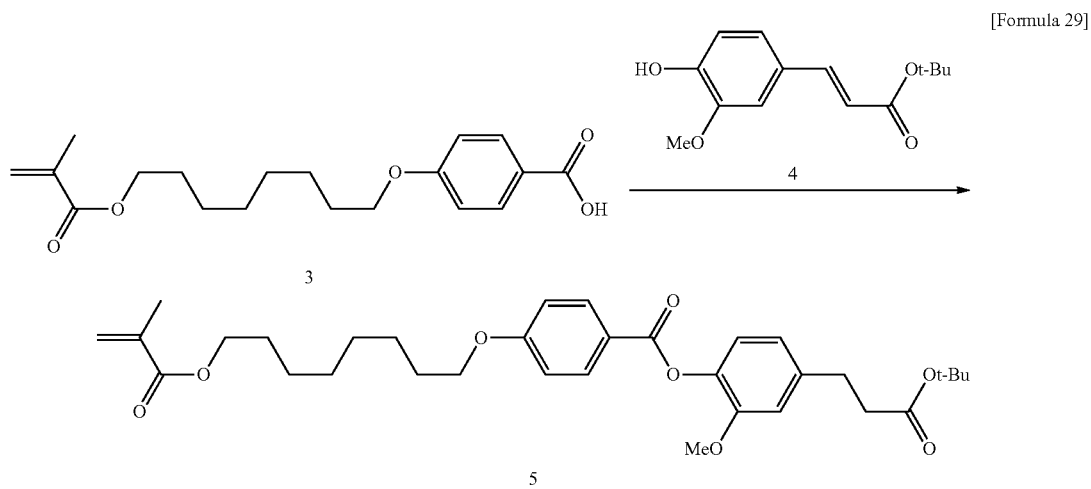

[Formula 29]

22.3 g (0.06676 mol) of the compound of formula 3, 16.7 g (0.06677 mol) of the compound of formula 4, and 1.22 g (10 mmol) of 4-dimeththeylamino pyridine were dissolved in 400 ml of dichloromethane, and the system was replaced with nitrogen while cooling with ice. Then, a solution dissolving 12.6 g (0.1 mol) of N,N'-diisopropyl carbodiimide in 100 ml of dichloromethane was dropped into the reaction liquid, and then it was stirred at room temperature overnight. The reaction liquid was filtered, and the reaction liquid was washed with 200 ml of 10% hydrochloric acid, and subsequently washed with 200 ml of a saturation salt solution three times, followed by drying with anhydrous magnesium sulfate. The solvent was distilled away to some extent, into which 70 g of silica gel was added to make a slurry, and then they were filled in an 100 g alumina/200 g silica gel column, and eluted with dichloromethane. The solvent was distilled away, and recrystallization was carried out in a mixture solvent of ethyl acetate/heptane, so as to obtain 31.8 g of the compounds of formula 5 as a white solid. A purity: 99% (HPLC). M+566.

Synthesis of the Compound of Formula 6

[Formula 30]

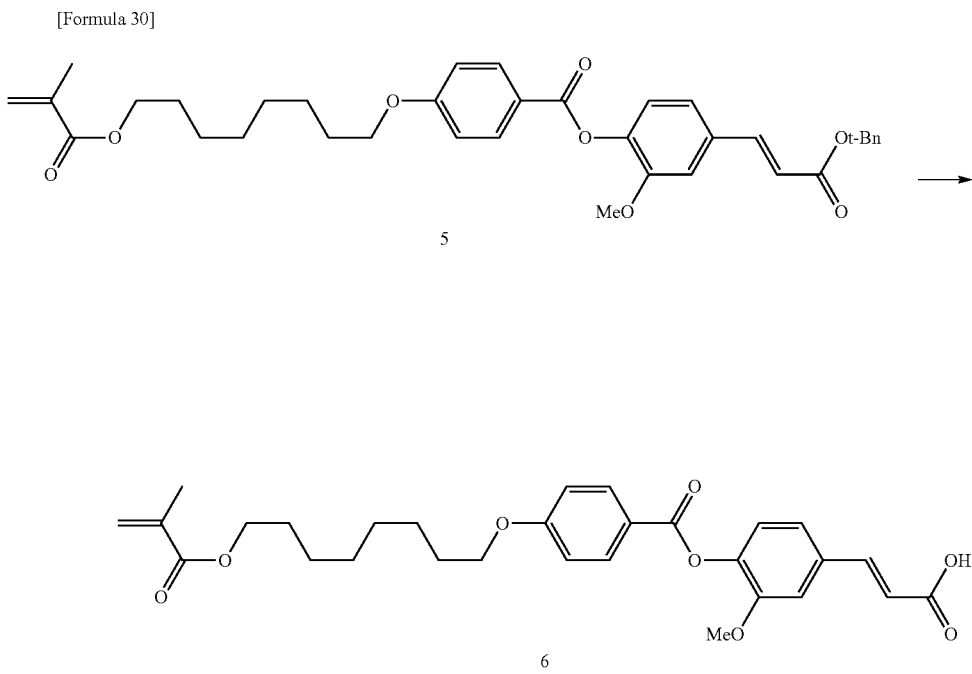

31.8 g (0.0562 mol) of the compound of formula 5 was dissolved in 200 ml of dichloromethane, and the system was replaced with nitrogen while cooling with ice. 32 g (0.280 mol) of trifluoroacetatec was dropped in the system, followed by stirring at room temperature overnight. It was confirmed by HPLC that the reaction was completed. 300 ml of heptane was added to the reaction liquid, and the solvent was distilled away to precipitate a solid, which was filtered for separation. The solid as obtained was washed with water and heptane to obtain 26 g of the targeted compound of formula 6 as colorless crystals. A purity: 99% (HPLC).

mmol) of N,N'-diisopropylcarbodiimide in 50 ml of dichloromethane was dropped into the reaction liquid, and then it was stirred at room temperature overnight. The reaction liquid was filtered, and the reaction liquid was washed with 100 ml of 10% hydrochloric acid, and subsequently washed with 100 ml of a saturation salt solution three times, followed by drying with anhydrous magnesium sulfate. Refinement was made by using a 30 g alumina/300 g silica gel column, and a mixture solvent of ethyl acetate/dichloromethane. The solvent was distilled away to obtain a solid, Synthesis of the Compound of Formula I-1-1

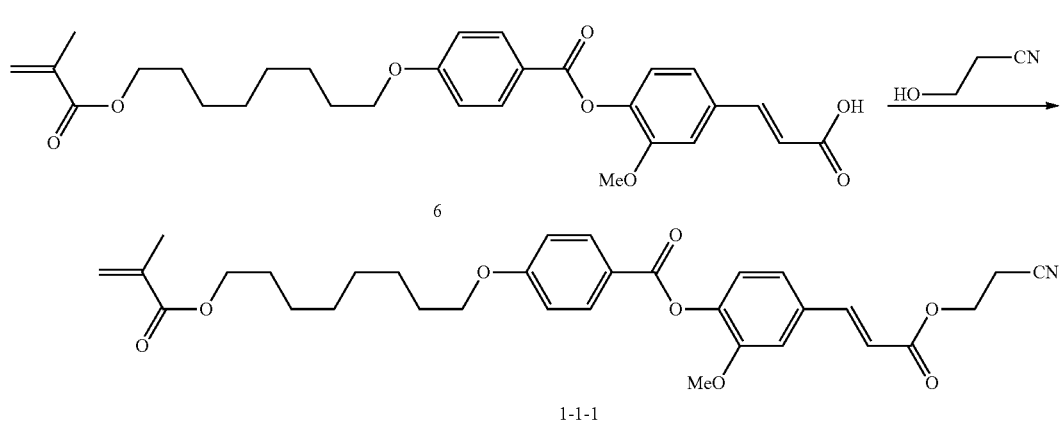

[Formula 31]

22.9 g (45 mmol) of the compound 6, 4.9 g (0.04 mol) of 3-hydroxypropionitrile, and 0.70 g (5.6 mmol) of 4-dimethylaminopyridine were dissolved in 200 ml of dichloromethane, and the system was replaced with nitrogen while cooling with ice. Then, a solution dissolving 7.87 g (64 which is recrystallized with methanol so as to obtain 16.4 g of the compound of formula I-1-1 as a white solid. A purity: 99.5% (HPLC). M+563.

Synthesis of Polymer P-I-1-1

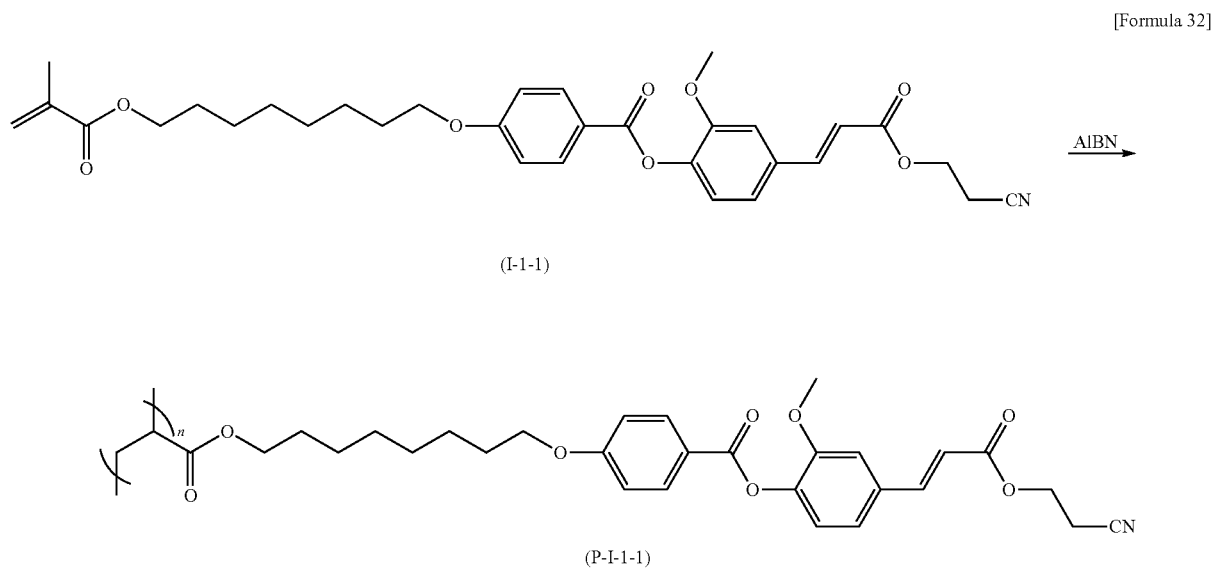

[Formula 32]

16.5 g of the compound of formula I-1-1 and 92 mg of AIBN were dissolved in 82.5 mL of THF, and reaction was made at nitrogen atmosphere at a temperature of 55° C. for six hours. Hexane was added to the obtained solution to precipitate the target, and then, the precipitations was dried at a reduced pressure to obtain 11 g of the objective polymer light alignment material P-I-1-1. The polymer had a weight average molecular weight of 198,000.

Synthetic Example 2

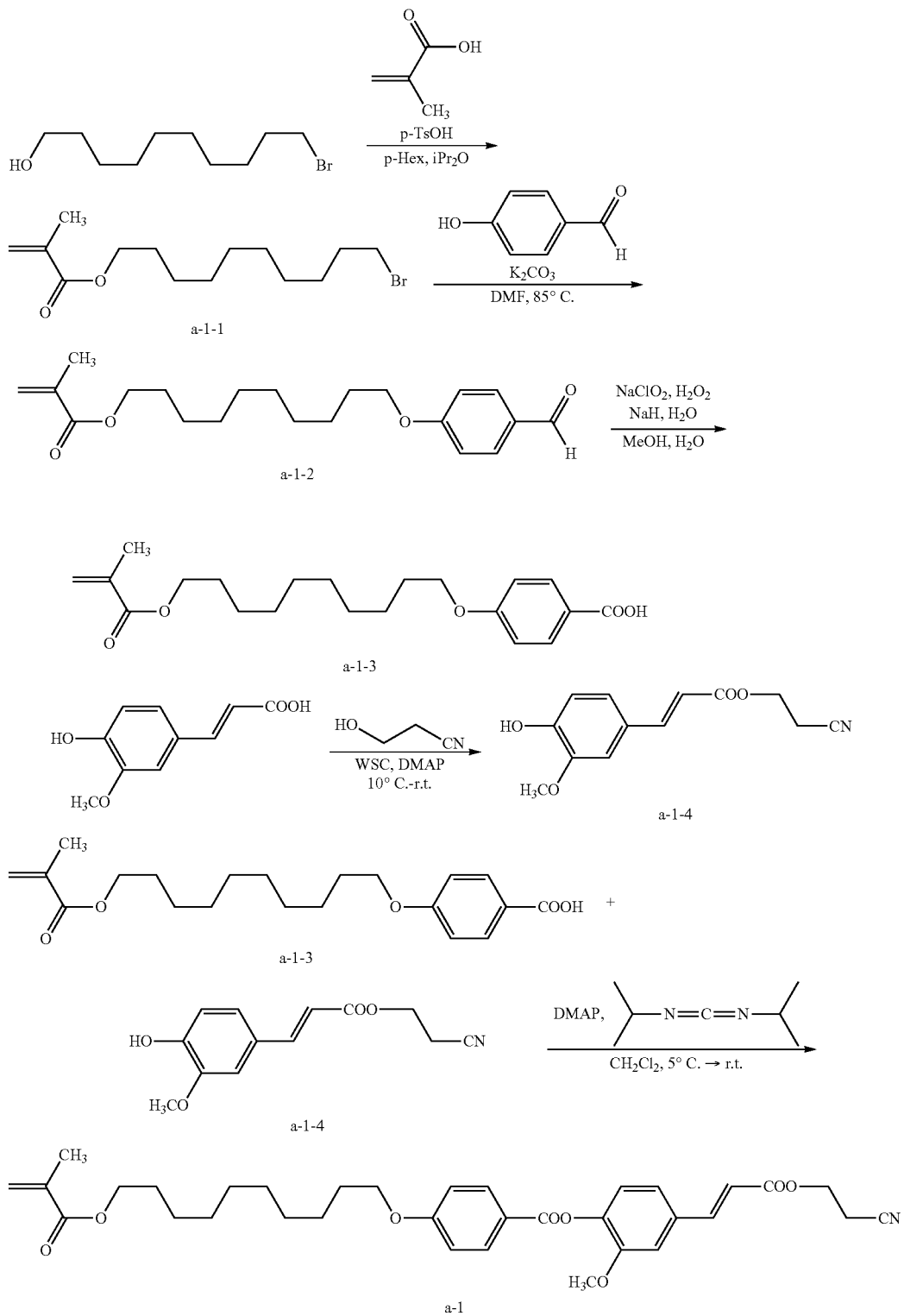

34 g of 10-bromo-1-decanol, 22 g of methacrylate, 70 mg of 4-methoxyphenol, 2 g of p-toluenesulfonate monohydrate, 200 mL of cyclohexane, and 40 mL of isopropyl ether were mixed together, and heated by an oil bath to carry out reflux for eight hours. The reaction liquid was cooled down to reach 30° C., followed by adding 100 mL of water to the reaction liquid to extract an organic layer. The organic layer was washed twice with 100 mL of a 5% sodium hydrogen carbonate aqueous solution and once with 100 mL of a saturated salt solution. After the washing, the organic layer was concentrated at a reduced pressure to obtain 50 g of the compound (a-1-1) as a colorless liquid. In a reaction vessel, 23 g of p-hydroxybenzaldehyde, 46 g of potassium carbonate, and 46 g of the compound (a-1-1) were suspended in 300 mL of DMF, followed by stirring at 90° C. for six hours to complete a reaction. The reaction liquid was cooled to reach 10° C., followed by dropping 650 mL of water to the reaction liquid so as to precipitate a solid. The solid was filtrated to obtain 72 g of the compound (a-1-2) as a brown granular solid. In the reaction vessel, 66 g of the compound (a-1-2) was dissolved in 980 mL of methanol, into which a sodium dihydrogen phosphate aqueous solution (i.e., the one in which 19 g of sodium dihydrogen phosphate dihydrate had been dissolved in 250 mL of water), and 30% hydrogen peroxide water (32 mL) were sequentially added. A sodium chlorite aqueous solution (i.e., the one in which 27 g of sodium chlorite at an 80% purity was dissolved in 220 mL of water) was added by dropping. After finishing the dripping, the reaction liquid was I stirred at 45° C. for three hours to complete the reaction. The reaction liquid was gradually cooled to reach 20° C., followed by dropping water to the reaction liquid so as to precipitate a solid. The solid was filtrated, and water was poured to the solid for washing. The crude product as a colorless flake shaped crystal was dried at a reduced pressure for eight hours so as to obtain 47 g of the compound (a-1-3) as a colorless crystal.

On the other hand, 54 g of 1-ethyl-3-(3-dimethylaminopropyl)carbo diimide hydrochloride, and 0.3 g 4-dimethylamino pyridine were dissolved in 406 mL of 2-cyanoethanol. Into this solution, another solution obtained by having 50 g of ferulic acid dissolved in 203 mL of 2-cyanoethanol was dropped at 10° C. for one hour, and then, stirred them at room temperature for four hours. The reaction liquid was mixed with cold water at a temperature of 15° C., and into the mixture solution, a toluene/THF mixture solvent was added to extract an organic layer.

The organic layer was washed with 200 mL of a saturated salt solution, and concentrated to obtain a yellow solid, which was then recrystallized to obtain 37 g of the compound (a-1-4) as a white solid.

39 g of the compounds (a-1-3), 28 g of the compound (a-1-4), and 0.3 g of 4-dimethylaminopyridine were suspended in 140 mL of dichloromethane. While the internal temperature was maintained at 10° C., 172 g of diisopropylcarbodiimide was dropped therein. Then, stirring was continued for three hours at 15-25° C. After confirming that the raw materials consumed, the reaction was deactivated by adding water to the reaction liquid. The deposits as obtained were filtrated, which were made into a dichloromethane solution, followed by purified by a column chromatography. The dichloromethane was distilled away from the dichloromethane solution at a reduced pressure, and then, methanol was added therein and cooled down to reach 0° C. for precipitating crystals. The crystals were filtrated and dried at a reduced pressure to obtain 51 g of methacrylate monomer (a-1).

16.5 g of thereby obtained methacrylate monomer (a-1) and 92 mg of AIBN were dissolved in 82.5 mL of THF, followed by causing a reaction at nitrogen atmosphere at 55° C. for six hours. Hexane was added to the obtained solution to precipitate the target, and then, the precipitations were dried at a reduced pressure to obtain 11 g of the objective polymethacrylate (polymer light alignment material P-I-1-2). The polymethacrylate (polymer light alignment material P-I-1-2) had a weight average molecular weight of 248,000.

The weight average molecular weight as mentioned above are obtained by a measurement result of GPC (gel permeation chromatography) under a condition described below. A GPC equipment, HLC-8220GPC made by Tosoh Corporation, was used as a measuring equipment; two sets of TSKgel GMHXL, one set of TSKgel G2000XL, and 4 sets of TSKgel G1000XL were used as an analytical column; A differential refractive index (RD detector was used as a detector; a polystyrene standard sample, STANDARD SM-105 (molecular weight range: 1,300-3,800,000) made by Showa Denko K.K., was used as a standard sample for preparing a calibration curve. The polymer as obtained was dissolved in THF to become a concentration of 1 μg/mL, and then, the measurement was made while THF was made a mobile phase; the liquid supply speed was 1 mL/m; the column temperature was 40° C.; and the sample injection quantity was 300 μL.

Adjustment Method of the Light Alignment Film

Example 1

The polymer light alignment material P-I-1-1 as synthesized above was dissolved in N-methyl-2-pyrrolidone (which is hereinafter referred to as NMP), followed by adding 2-butoxyethanol therein. Then, the weight ratio was adjusted as follow. NMP: 2-butoxyethanol:polymer light alignment material P-I-1-1=47.5:47.5:5. Then, filtration was performed with an MS PTFE syringe filter (5 um, 1 um, 0.45 um) made by Membrane Solutions Corporation to obtain a light alignment film solution. The solution was subject to spin coat by using a spin coater, IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, it was dried at 180° C. in air atmosphere using an oven, DO-600FA made by AS ONE Corporation for five minutes. After the drying, it was gradually cooled to reach room temperature. Then, after the drying process above, by using an irradiation equipment as showed in FIG. 10, while the dried film was maintained at a temperature of 25° C., a linear polarized light of 313 nm was irradiated for five seconds at 100 mJ/cm² so as to prepare a light alignment film of the present invention.

Example 2

The polymer light alignment material P-I-1-1 as synthesized above was dissolved in N-methyl-2-pyrrolidone (hereinafter, NMP), followed by adding 2-butoxyethanol therein. Then, the weight ratio was adjusted as follow. NMP: 2-butoxyethanol:polymer light alignment material P-I-1-1=47.5:47.5:5. Then, filtration was performed with an MS PTFE syringe filter (5 um, 1 um, 0.45 um) made by Membrane Solutions Corporation to obtain a light alignment film solution. The solution was subject to spin coat by using a spin coater, IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, it was dried at 180° C. in air atmosphere using an oven, DO-600FA made by AS ONE Corporation for five minutes. After the drying, it was gradually cooled to reach room temperature. Then, after the drying process above, by using an irradiation equipment as showed in FIG. 10, while the dried film was maintained at a temperature of 50° C., a linear polarized light of 313 nm was irradiated for five seconds at 100 mJ/cm$^2$ so as to prepare a light alignment film of the present invention.

Example 3

The polymer light alignment material P-I-1-1 as synthesized above was dissolved in N-methyl-2-pyrrolidone (hereinafter, NMP), followed by adding 2-butoxyethanol therein. Then, the weight ratio was adjusted as follow. NMP: 2-butoxyethanol:polymer light alignment material P-I-1-1=47.5: 47.5:5. Then, filtration was performed with an MS PTFE syringe filter (5 um, 1 um, 0.45 um) made by Membrane Solutions Corporation to obtain a light alignment film solution.

The solution was subject to spin coat by using a spin coater, IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, it was dried at 180° C. in air atmosphere using an oven, DO-600FA made by AS ONE Corporation for five minutes. After the drying, it was gradually cooled to reach room temperature. Then, after the drying process above, by using an irradiation equipment as showed in FIG. 10, while the dried film was maintained at a temperature of 70° C., a linear polarized light of 31.3 nm was irradiated for five seconds at 100 mJ/cm$^2$ so as to prepare a light alignment film of the present invention.

Example 4

The polymer light alignment material P-I-1-1 as synthesized above was dissolved in N-methyl-2-pyrrolidone (hereinafter, NMP), followed by adding 2-butoxyethanol therein. Then, the weight ratio was adjusted as follow. NMP: 2-butoxyethanol:polymer light alignment material P-I-1-1=47.5: 47.5:5. Then, filtration was performed with an MS PTFE syringe filter (5 um, 1 um; 0.45 um) made by Membrane Solutions Corporation to obtain a light alignment film solution.

The solution was subject to spin coat by using a spin coater, IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, it was dried at 180° C. in air atmosphere using an oven, DO-600FA made by AS ONE Corporation for five minutes. After the drying, it was gradually cooled to reach room temperature. Then, after the drying process above, by using an irradiation equipment as showed in FIG. 10, while the dried film was maintained at a temperature of 100° C., a linear polarized light of 313 nm was irradiated for five seconds at 100 mJ/cm$^2$ so as to prepare a light alignment film of the present invention.

Example 5

The polymer light alignment material P-I-1-1 as synthesized above was dissolved in N-methyl-2-pyrrolidone (hereinafter, NMP), followed by adding 2-butoxyethanol therein. Then, the weight ratio was adjusted as follow. NMP:2-butoxyethanol:polymer light alignment material P-I-1-1=47.5:47.5:5. Then, filtration was performed with an MS PTFE syringe filter (5 um, 1 um, 0.45 um) made by Membrane Solutions Corporation to obtain a light alignment film solution.

The solution was subject to spin coat by using a spin coater. IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, it was dried at 180° C. in air atmosphere using an oven, DO-600FA made by AS ONE Corporation for five minutes. After the drying, it was gradually cooled to reach room temperature. Then, after the drying process above, by using an irradiation equipment as showed in FIG. 10, while the dried film was maintained at a temperature of 120° C., a linear polarized light of 313 nm was irradiated for five seconds at 100 mJ/cm$^2$ so as to prepare a light alignment film of the present invention.

Examples 6 to 13

The polymer light alignment material P-I-1-2 as synthesized above was dissolved in N-methyl-2-pyrrolidone (hereinafter, NMP), followed by adding 2-butoxyethanol therein. Then, the weight ratio was adjusted as follow. NMP:2-butoxyethanol:polymer light alignment material P-I-1-1=47.5:47.5:5. Then, filtration was performed with an MS PTFE syringe filter (5 um, 1 um, 0.45 um) made by Membrane Solutions Corporation to obtain six light alignment film solutions.

Each of the six solutions was subject to spin coat by using a spin coater, IH-DX2 made by Mikasa Co., Ltd., to have a thickness of approximately 90 nm on a substrate SZ-B107MIN (up/low) made by E.H.C Corporation. Then, it was dried at 80° C. on a hot plate, Digital Hot Plate NINOS ND1 made by AS ONE Corporation for three minutes. Furthermore, each was dried at 180° C. in air atmosphere using an oven, DO-600FA made by AS ONE Corporation, for five minutes. After the drying, it was gradually cooled to reach room temperature. Then, after the drying process above, by using an irradiation equipment as showed in FIG. 10, while the dried film was each maintained at a temperature of 25° C., 40° C., 55° C., 70° C., 85° C. or 100° C., a linear polarized light of 313 nm was irradiated for five seconds at 100 mJ/cm$^2$ so as to prepare six kinds of light alignment films of the present invention.

Evaluation of the Light Alignment Film

Using the substrates prepared in Examples 1 to 13, liquid crystal cells sandwiching the liquid crystal PA0500 made by DIC Corporation. When measuring the anchoring energy of the liquid crystal cells above, it was confirmed that an anchoring energy was varied depending on the temperature when the polarized light had been irradiated (see FIG. 11).

As described above, it was found that the present invention can prepare a light alignment film provided with strong anchoring energy even if significantly reducing the tact time which was required to be long in the conventional photo alignment materials. Here, the measurement of the anchoring energy was as follows.

Using a liquid crystal cell, in accordance with so-called, a torque balance method (i.e., the method reported at pages 251 to 252 in the Panel Discussion Proceedings, Japanese Liquid Crystal Society (2001)), an azimuthal anchoring energy of the light alignment film was measured. In detail, the liquid crystal composition (A) was injected into a liquid crystal cell, and heated at 92° C. for two minutes, and then cooled down to reach room temperature. An optical measurement device (OMS-DI4RD made by Chuo Precision Industrial Co., Ltd. was provided with a white light source, a polarizer (a polarizing plate at the incident side), an analyzer (a polarizing plate at the exit side), and a detector. The liquid crystal cell was disposed between the light polarizer and the analyzer. While rotating the light polarizer and the analyzer, the light quantity of the transmitted light was detected by the detector. The rotation angle of the light polarizer and the analyzer when the detected light quantity became the smallest, which angle is assumed to be the twist angle $\varphi_1$.

Then, the liquid crystal composition (A) was removed from the liquid crystal cell, and instead, the liquid crystal composition (B) was injected therein. Then, it heated at 92° C. for two minutes, and then cooled down to reach the room temperature. Using the liquid crystal cell, in the same manner as explained above, the rotation angle of the light polarizer and the analyzer was detected to be assumed as the twist corner $\varphi_2$.

The azimuthal anchoring energy A was calculated by the formula (1). It is noted that $K_{22}$ is a twist elasticity coefficient of the liquid crystal, d is a cell gap, p is a spiral pitch of the liquid crystal with chiral.

$$A = 2K_{22}(2\pi d/p - \varphi_2)/d \cdot \sin(\varphi_2 - \varphi_1) \qquad (1)$$

The azimuthal anchoring energy as obtained is shown in FIG. 11.

As a result, it was found that the anchoring energy was improved on all the polymers at 40° C. to 85° C. as shown in FIG. 11. It was found that more preferably the effects were significant by heating at 60° C. to 70° C.

EXPLANATION OF THE REFERENCES IN THE DRAWINGS

111: power supply;
112: ultraviolet rays lamp;
113: non-polarized ultraviolet rays (whole wavelengths);
114: interference filter;
115: non-polarized ultraviolet rays (313 nm);
116: polarizing filter;
117: polarized ultraviolet rays (313 nm);
118: light alignment film;
119: glass substrate;
1110: heating plate;
100: first substrate;
102: TFT layer;
103: pixel electrode;
104: passivation film;
105: first alignment film;
200: second substrate;
201: flattened film (overcoat layer);
202: black matrix;
203: color filter;
204: transparent electrode;
205: second alignment film;
301: seal material;
302: protrusion (columnar spacer);
303: liquid crystal layer;
304: protrusion (columnar spacer);
401: mask pattern;
402: resin layer;
L: light;
1, 8: polarizing plate;
2: first substrate;
3: electrode layer;
4: alignment film;
5: liquid crystal layer;
6: color filter;
203: 6G color filter green;
203: 6R color filter red;
7: second substrate;
11: gate electrode;
12: gate insulating film;
13: semiconductor layer;
14: insulating layer;
15: ohmic contact layer;
16: drain electrode;
17: source electrode;
18: insulating protective layer;
21: pixel electrode;
22: common electrode;
23: storage capacitor;
25: data wiring;
27: source wiring;
29: common line;
30: buffers layer.

What is claimed is:

1. A method for manufacturing a liquid crystal alignment film, comprising:
a process (I) of mixing a solvent with a photoresponsive polymer represented by general formula (2):

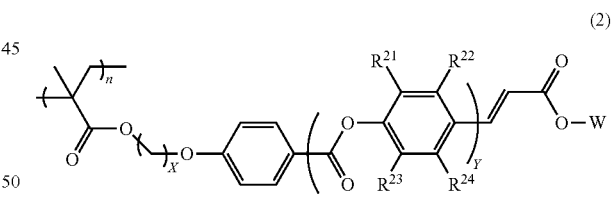

wherein $R^{21}$ to $R^{24}$ are each independently hydrogen atom, or an alkoxy group having a carbon atom number of 1 to 5; W represents at least one of the following selected from the group consisting of general formulae (W-1) to (W-8),

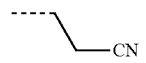

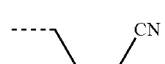

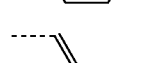

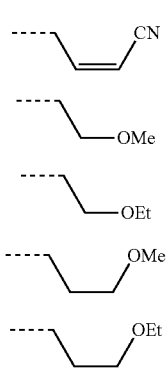

X represents an integer of 6 to 12; Y represents an integer of 1; n represents repeating unit, to prepare a photoresponsive polymer solution;

a process (II) of coating the photoresponsive polymer solution on a substrate, followed by drying at 50 to 100° C. for 1 to 3 minutes and then drying at 120° C. to 180° C. for 5 to 75 minutes to form a coating film; and a process (III) of adjusting a temperature of the coating film while the coating film is irradiated with a light of 200 to 350 nm at 50° C. to 90° C.

2. The method for manufacturing the liquid crystal alignment film according to claim 1, wherein the light of 200 to 350 nm is a linear polarized light irradiated from nearly the vertical direction with respect to the substrate, at an exposure dose of 10 to 100 mJ/cm$^2$.

3. The method for manufacturing the liquid crystal alignment film according to claim 1, wherein liquid crystal molecules are oriented in nearly a horizontal direction with respect to the substrate.

4. The method for manufacturing the liquid crystal alignment film according to claim 1, wherein the coating film obtained by the process (II) has an average thickness of 10 to 100 nm.

5. The method for manufacturing the liquid crystal alignment film according to claim 1, wherein the light is a polarized light having a wavelength of 250 to 330 nm.

6. A liquid crystal display element, comprising the liquid crystal alignment film obtained by the method of claim 1.

* * * * *